United States Patent
Greehy et al.

(10) Patent No.: US 12,066,982 B2
(45) Date of Patent: Aug. 20, 2024

(54) DATA ASSET SHARING

(71) Applicant: Palantir Technologies Inc., Palo Alto, CA (US)

(72) Inventors: Alexandra Greehy, London (GB); Craig Massie, London (GB); Alexander Bell-Thomas, Monmouthshire (GB); Helena Kertesz, London (GB); Mihai Condur, London (GB); Nicolas Prettejohn, Bath (GB); Pieris Christofi, London (GB); Sam Stoll, London (GB)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 17/820,729

(22) Filed: Aug. 18, 2022

(65) Prior Publication Data

US 2023/0306000 A1  Sep. 28, 2023

Related U.S. Application Data

(60) Provisional application No. 63/362,583, filed on Apr. 6, 2022, provisional application No. 63/362,028, filed on Mar. 28, 2022.

(51) Int. Cl.
 G06F 17/30 (2006.01)
 G06F 16/176 (2019.01)
 G06F 21/62 (2013.01)

(52) U.S. Cl.
 CPC ........ G06F 16/176 (2019.01); G06F 21/6218 (2013.01)

(58) Field of Classification Search
 CPC ........ G06F 16/13; G06F 16/24; G06F 16/156; G06N 3/00; G06N 5/00; G05B 13/00
 See application file for complete search history.

(56) References Cited

U.S. PATENT DOCUMENTS 8,516,050 B1 *  8/2013  Chapweske ........ H04N 1/00244
                                                     709/204
8,683,557 B1 *  3/2014  Desikan ................. G06Q 50/01
                                                         726/8

(Continued)

FOREIGN PATENT DOCUMENTS

| EP | 4 254 244 | 10/2023 |
| WO | WO 2022/109618 | 5/2022 |
| WO | WO 2022/245989 | 11/2022 |

OTHER PUBLICATIONS

Yang et al., "A Purpose-Based Access Control Model", Third International Symposium on Information Assurance and Security, IEEE, Aug. 1, 2007, pp. 143-148.

(Continued)

*Primary Examiner* — Hung D Le
(74) *Attorney, Agent, or Firm* — Knobbe, Martens, Olson & Bear, LLP

(57) ABSTRACT

A computer system provides shared access to electronic data assets. The system may perform operations including: receiving, from a first user, a request to access a shared data asset, wherein: the shared data asset is associated with a shared data asset object, and the shared data asset object identifies at least a second user authorized to approve sharing of the shared data asset; in response to receiving the request from the first user: generating a data access request object including at least an identification of the first user and an identification of the shared data asset object; and providing an indication of the data access request object to the second user associated with the shared data asset object; receiving, from the second user, an approval of the request; and in response to receiving the approval of the request from the second user: granting the first user access to the shared data asset associated with the shared data asset object.

17 Claims, 20 Drawing Sheets

(56) References Cited

U.S. PATENT DOCUMENTS

| | | | | |
|---|---|---|---|---|
| 8,789,094 | B1* | 7/2014 | Singh | H04N 21/4788 |
| | | | | 725/62 |
| 9,083,728 | B1* | 7/2015 | Lavian | G06Q 30/02 |
| 9,641,334 | B2 | 5/2017 | Faitelson et al. | |
| 10,484,452 | B2* | 11/2019 | Reyes | H04M 7/0027 |
| 11,108,828 | B1 | 8/2021 | Curtis et al. | |
| 11,157,572 | B1* | 10/2021 | Anima | G06F 16/24575 |
| 11,210,278 | B1 | 12/2021 | Dean et al. | |
| 11,212,362 | B2* | 12/2021 | Dhara | H04L 67/306 |
| 11,457,079 | B1* | 9/2022 | Mehta | H04L 67/133 |
| 11,539,783 | B1* | 12/2022 | Gupta | H04W 12/04 |
| 11,748,456 | B2* | 9/2023 | Haydon | G06F 21/105 |
| | | | | 726/26 |
| 11,832,100 | B2* | 11/2023 | Sanciangco | H04L 63/06 |
| 2001/0034617 | A1* | 10/2001 | Kimata | G16H 40/67 |
| | | | | 705/3 |
| 2007/0094145 | A1* | 4/2007 | Ta | G06F 21/105 |
| | | | | 705/59 |
| 2008/0120620 | A1 | 5/2008 | Lett et al. | |
| 2009/0099921 | A1* | 4/2009 | Klein | G06Q 30/02 |
| | | | | 705/14.69 |
| 2009/0276463 | A1* | 11/2009 | Miller | G16H 10/20 |
| 2010/0004944 | A1* | 1/2010 | Palaniappan | G06Q 10/10 |
| | | | | 707/E17.108 |
| 2012/0278425 | A1 | 11/2012 | Maxted | |
| 2012/0296832 | A1* | 11/2012 | Beringer | G06Q 10/10 |
| | | | | 705/80 |
| 2013/0145284 | A1* | 6/2013 | Anantharaman | G06F 21/10 |
| | | | | 715/753 |
| 2014/0047330 | A1* | 2/2014 | Yan | G06Q 10/101 |
| | | | | 715/273 |
| 2014/0067929 | A1* | 3/2014 | Kirigin | H04L 67/06 |
| | | | | 709/204 |
| 2014/0149505 | A1* | 5/2014 | Christiansen | H04L 65/403 |
| | | | | 709/204 |
| 2014/0173755 | A1 | 6/2014 | Wahl | |
| 2014/0215004 | A1* | 7/2014 | Daly, Jr. | G06F 16/93 |
| | | | | 709/214 |
| 2014/0245185 | A1* | 8/2014 | Knodt | H04L 65/4046 |
| | | | | 715/753 |
| 2015/0066556 | A1* | 3/2015 | Dominick | G06Q 50/18 |
| | | | | 705/7.15 |
| 2015/0095352 | A1* | 4/2015 | Lacey | G06F 21/6218 |
| | | | | 707/752 |
| 2015/0163788 | A1* | 6/2015 | Karunakaran | H04W 72/51 |
| | | | | 370/254 |
| 2015/0169069 | A1* | 6/2015 | Lo | H04L 65/403 |
| | | | | 715/753 |
| 2015/0347971 | A1* | 12/2015 | D'Amore | G06Q 10/101 |
| | | | | 705/300 |
| 2016/0048486 | A1* | 2/2016 | Lopategui | G06F 40/197 |
| | | | | 715/229 |
| 2016/0065571 | A1* | 3/2016 | Hoyos | H04L 63/0428 |
| | | | | 713/168 |
| 2016/0070812 | A1* | 3/2016 | Murphy | G06F 21/6218 |
| | | | | 707/608 |
| 2016/0096110 | A1* | 4/2016 | Decoufle | G06Q 50/01 |
| | | | | 463/29 |
| 2016/0308855 | A1* | 10/2016 | Lacey | H04L 63/061 |
| 2017/0041690 | A1* | 2/2017 | Agarwal | H04J 14/0213 |
| 2017/0078392 | A1* | 3/2017 | Gray | H04L 67/02 |
| 2017/0093786 | A1* | 3/2017 | Baca | H04L 51/52 |
| 2017/0093867 | A1 | 3/2017 | Burns et al. | |
| 2017/0141983 | A1* | 5/2017 | Childress | H04L 61/103 |
| 2017/0171214 | A1 | 6/2017 | Anderson et al. | |
| 2017/0199657 | A1* | 7/2017 | Mullins | G06F 3/0482 |
| 2017/0329498 | A1* | 11/2017 | Schikora | G06F 3/04842 |
| 2018/0174104 | A1* | 6/2018 | Schikora | G06Q 10/103 |
| 2018/0189509 | A1 | 7/2018 | Goldsteen et al. | |
| 2018/0210936 | A1 | 7/2018 | Reynolds et al. | |
| 2018/0315042 | A1* | 11/2018 | Rungta | G06Q 20/385 |
| 2018/0349406 | A1* | 12/2018 | Shortlidge | G16H 10/60 |
| 2018/0356961 | A1* | 12/2018 | Lewis | G06Q 50/01 |
| 2018/0365439 | A1 | 12/2018 | Milman et al. | |
| 2019/0034936 | A1* | 1/2019 | Nolan | G06Q 20/3829 |
| 2019/0141488 | A1* | 5/2019 | Yedvab | H04W 4/38 |
| 2019/0319932 | A1* | 10/2019 | Kandregula | H04L 63/0421 |
| 2020/0074107 | A1 | 3/2020 | Barbas et al. | |
| 2020/0153887 | A1* | 5/2020 | Choi | H04L 67/06 |
| 2020/0169465 | A1* | 5/2020 | Stelmar Netto | H04L 67/10 |
| 2020/0229258 | A1 | 7/2020 | Wang et al. | |
| 2020/0286089 | A1* | 9/2020 | Cleaver | G06Q 20/401 |
| 2020/0334377 | A1* | 10/2020 | Turgeman | G06F 21/6245 |
| 2020/0380007 | A1 | 12/2020 | Langseth et al. | |
| 2020/0380008 | A1* | 12/2020 | Chu | G06F 16/252 |
| 2021/0064769 | A1 | 3/2021 | Yu et al. | |
| 2021/0165898 | A1* | 6/2021 | Weiss | G06F 16/13 |
| 2021/0266323 | A1 | 8/2021 | Jani et al. | |
| 2021/0318980 | A1* | 10/2021 | Pal | G06F 13/4022 |
| 2021/0409413 | A1* | 12/2021 | Mariappan | G06K 19/06037 |
| 2022/0114246 | A1* | 4/2022 | El Guindi | H04L 63/0435 |
| 2022/0164465 | A1 | 5/2022 | Prettejohn et al. | |
| 2022/0201049 | A1* | 6/2022 | Jamison | H04L 65/403 |
| 2022/0255914 | A1* | 8/2022 | Fan | H04L 63/08 |
| 2022/0261144 | A1 | 8/2022 | Dennis et al. | |
| 2022/0374535 | A1 | 11/2022 | Jagasia et al. | |
| 2023/0029402 | A1* | 1/2023 | Henkens | H04L 12/1822 |
| 2023/0079267 | A1* | 3/2023 | Brindley | H04L 63/0876 |
| | | | | 705/38 |
| 2023/0140819 | A1* | 5/2023 | Hile | H04W 4/48 |
| | | | | 370/329 |
| 2023/0145127 | A1* | 5/2023 | Barnum | H04L 63/205 |
| | | | | 726/4 |
| 2023/0169204 | A1* | 6/2023 | Blunt | G06F 21/6245 |
| | | | | 726/26 |
| 2023/0199052 | A1* | 6/2023 | Springer | H04L 65/762 |
| | | | | 348/14.03 |
| 2023/0214508 | A1* | 7/2023 | Munisamy | G06F 21/10 |
| | | | | 726/29 |
| 2023/0230152 | A1* | 7/2023 | Debreczeni | G06T 19/006 |
| | | | | 705/27.2 |
| 2023/0244802 | A1* | 8/2023 | Paul | G06F 21/6218 |
| | | | | 707/608 |
| 2023/0274277 | A1* | 8/2023 | Kurani | G06Q 20/18 |
| | | | | 705/39 |

OTHER PUBLICATIONS

International Search Report and Written Opinion for International Application No. PCT/US2021/072557 dated Mar. 22, 2022, 13 pages.

International Search Report and Written Opinion for International Application No. PCT/US2022/029896 dated Sep. 7, 2022, 12 pages.

U.S. Appl. No. 17/456,098, Controlling Access to Electronic Data Assests, filed Nov. 22, 2021.

U.S. Appl. No. 17/663,996, Controlling User Actions and Access to Electronic Data Assets, filed May 18, 2022.

U.S. Appl. No. 18/158,395, Exploration and Access to Electronic Data Assets, Jan. 23, 2023.

International Preliminary Report on Patentability and Written Opinion for International Application No. PCT/US2021/072557 dated Jun. 1, 2023, 10 pages.

Official Communication for European Patent Application No. 22198782.9 dated May 23, 2023, 7 pages.

International Preliminary Report on Patentability and Written Opinion for International Application No. PCT/US2022/029896 dated Nov. 30, 2023, 9 pages.

Kabir et al., "A Role-Involved Purpose-Based Access Control Model", Inf Syst Front, (2012), 14:809-822.

Official Communication for European Patent Application No. 23191744.4 dated Feb. 12, 2024, 8 pages.

* cited by examiner

802

804 — Data Library [11] | Requests [7] | Purposes

| | Title | Tags | Updated At | Owner |
|---|---|---|---|---|
| | API | Aviation | Oct 1, 2021, 11:06 AM | Corp G. |
| | Aggregated COVID Cases | Reporting | Sep 30, 2021, 9:25 PM | Corp G. |
| | Aggregated Measures of Flow | Aviation +2 more | Sep 30, 2021, 9:26 PM | Corp G. |
| | COVID Testing Results | Nil | Sep 30, 2021, 9:23 PM | Corp G. |
| | Demo | Reporting | Oct 21, 2021, 3:21 PM | Corp G. |
| | Demo | Transport | Oct 21, 2021, 3:17 PM | Corp G. |
| | Demo3 | Aviation | Oct 21, 2021, 3:26 PM | Corp G. |
| | Disruption | Aviation +2 more | Sep 30, 2021, 9:29 PM | Corp G. |

808 — 806

Find Data...

FILTER BY TAG
Search...

SEARCH TERMS

OWNER
☐ Corp G  11

Add filter

Menu ▼

FIG. 8A

908 { Summary  Assets  Forms  Conversation  Updates  Approvals

Requester: Corp G | Version: 2 | In Progress | Menu ⌄

∞ Data Request Form — 904

Make Changes ⌝ — 906

Headline Summary
Please provide an Overview of what this agreement is seeking to achieve
| xxx

Rationale for Request
In the context of Business Requirements and Validation. Please Ensure you provide the purpose(s) and intended task(s) where the data will be used
| xxx

Aggregation Information
Do you require agreement/non-identifying/anonymized or granular, identifying information relating to individuals or businessed to satisfy your purpose(s)?
| xx

Is the data necessary for the task?
This includes whether the form of the assets agreemented are proportional and sufficient
| Response missing

Annex: Specific to Org
| Appendix for Org specific Questions

Benefits/Criticality: will it support strategic objectives?
What are the benefits to this agreement? is your agreement critical to the business? please provide reasons and quantity where possible ⊡ Demo6
Purpose Name
Consuming
■ Assets Requested
⊙ Aggregated Measures of Flow
Owner: | Corp G.
⊛ Document Read Access
| Corp G.
⊙ Document Write Access
| Corp G.

| Summary | Assets | Forms | Conversation | Updates | Approvals | | Requester: Corp G | Version: 2 | In Progress | Menu ⌄ |

Core Data Request Form — 912

▦ Annex: Specific to Org

▦ Asset Scoping: Aggregated Measures of Flow

▦ Core Data Request Form ✎ Update

Description
This template was produced and standardised by <org> for cross-org data sharing interaction

Headline Summary
Please provide an Overview of what this agreement is seeking to achieve
| xxx

Rationale for Request
In the context of Business Requirements and Validation. Please Ensure you provide the purpose(s) and intended task(s) where the data will be used
| xxx

Aggregation Information
Do you require agreement/non-identifying/anonymized or granular, identifying information relating to individuals or businesses to satisfy your purpose(s)?
| xx

Is the data necessary for the task?
This includes whether the form of the assets agreemented are proportional and sufficient
| Response missing

902 —▶ | Summary | Assets | Forms | Conversation | Updates | Approvals | Requester: Corp G | Version: 2 | In Progress | Menu ˅

920 — Approvals
922 — (Pending Approvers)
924 — (Stale Responses)
926 — Valid Responses

Pending Approvers
These departments are required approvers for at least one of the assets being requests, but we haven't had a response from them yet.

☐ Department A
☐ Department B

Stale Responses
A response goes stale if the request is significantly changed after the response is given by a department. Approvers will need to be reacknowledged.

No objects found

Valid Responses
All responses form a department concerning this request. Responses may be one of, approved, changes request and rejected.

No objects found

☐ Department C

(f) Publish Data Sharing Agreement                                    ✕

Acknowledgement * ⊙

○ I Understand this will share the request with other departments

◉ I don't consent to sharing this

ⓘ 1 issue

Cancel

Submit

FIG. 9F

DATA ASSET SHARING

CROSS-REFERENCE TO RELATED APPLICATIONS

This application claims benefit of U.S. Provisional Patent Application No. 63/362,028, filed Mar. 28, 2022, and titled "CONTROLLING SHARING OF ELECTRONIC DATA ASSETS", and U.S. Provisional Patent Application No. 63/362,583, filed Apr. 6, 2022, and titled "DATA ASSET SHARING". This application also relates to U.S. Patent Application Publication No. 2022/0164465, published Apr. 26, 2022, and titled "CONTROLLING ACCESS TO ELECTRONIC DATA ASSETS." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

Embodiments of the present disclosure relate to systems and techniques for controlling access to electronic data assets. More specifically, the present disclosure includes controlling access, for example by managing and auditing access to, and providing shared access to, electronic data assets using data access request objects.

BACKGROUND

A background is provided for introductory purposes and to aid the reader in understanding the detailed description. The background should not be taken as an admission of any prior art to the claims.

Some computer systems limit access to electronic data assets by requiring authentication credentials, such as a username and password. Some computer systems also impose authorization restrictions that specify which user or groups of users can read, write, or modify an electronic data asset.

However, these computer systems can be insufficient for protecting and auditing access to electronic data assets. Furthermore, the use of authentication credentials and authorization restrictions, without more, can be inefficient and take large amounts of time, data, and memory to administer, especially when making large scale changes. Authentication credentials and authorization restrictions may also be insufficient for protecting private or confidential electronic data assets.

SUMMARY

The systems, methods, and devices described herein each have several aspects, no single one of which is solely responsible for its desirable attributes. Without limiting the scope of this disclosure, several non-limiting features will now be described briefly.

In general, access to data assets may be managed by assigning authentication credentials (e.g., usernames and passwords) to users. Computer administrators may further impose authorization restrictions specifying which users or groups of users can read, write, or modify a data asset. But sharing of data assets is not addressed by such authentication and authorization. For example, typical data systems may not include mechanisms and user interfaces for designating data assets for sharing, discovery of shared data assets, tracking of requests for access to shared data assets, sharing of data assets, filtering of shared data assets, tracking the lineage or provenance of data assets, and revoking access to shared data assets, among other functionality.

A computer system is provided for sharing data assets, including optionally sharing across organizations. Advantageously, the system may provide technical mechanisms and interactive graphical user interfaces that address one or more, or all, of the previously mentioned deficiencies of typical data systems. In particular, the system may provide technical mechanisms and interactive graphical user interfaces that enable designating data assets for sharing, discovery of shared data assets, tracking of requests for access to shared data assets, sharing of data assets, filtering of shared data assets, tracking the lineage or provenance of data assets, and revoking access to shared data assets, among other functionality.

The system may advantageously bring data governance to the forefront, providing structure to previously unstructured governance metadata using data objects (also referred to herein simply as "objects"). Advantageously, through the use of objects, governance can be integrated into a "data sharing framework" such that users cannot share or access shared data without proceeding though a well-defined process that can: (1) improve data owners' visibility into where data is being shared and how data is being used, (2) aid in accountability by providing well-defined roles and capturing metadata that is useful for audit, and (3) enable revoking of sharing permissions and time bounds on permissions, among other advantages.

The system includes generating objects associated with users, data assets, shared data assets, and data access requests, among other objects. "Shared data asset" objects include metadata associated with a shared data asset, including, for example, schema, update frequencies, owners, tags, approvers, column identifiers, column descriptions, derivation (also referred to herein as provenance or lineage), scoping or filtering, and the like. "Data access request" objects include metadata associated with a request to access a data asset (including a shared data asset), including, for example, forms, conversations, updates, approvals, re-approvals, statuses, versions, and the like. Such data access request objects may be version controlled. Storage of metadata associated with the various aspects of the system in the various objects can advantageously enable investigation and auditing.

The system may store data assets in various namespaces (also referred to herein as workspaces), and sharing of data and data assets may be accomplished by updating the namespaces associated with a given data asset. Advantageously, the system may enable sharing of data assets across organizations. Advantageously, the system may integrate the data sharing functionality of the system with purpose-based data access aspects as described herein and also in U.S. Patent Application Publication No. 2022/0164465, published Apr. 26, 2022, and titled "CONTROLLING ACCESS TO ELECTRONIC DATA ASSETS" (the "'465 Publication"), which is incorporated by reference herein.

Further, according to various embodiments, various interactive graphical user interfaces are provided for allowing various types of users interact with the systems and methods described herein to, for example, generate, review, and/or modify data asset objects, shared data asset objects, data access request objects, and/or the like.

The interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in-memory databases) is limited in various ways (e.g., manual data review is slow, costly, and less detailed; data is too voluminous; and/or the like), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed information via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with and presentation of various types of electronic data.

Various combinations of the above and below recited features, embodiments, and aspects are also disclosed and contemplated by the present disclosure.

Additional embodiments of the disclosure are described below in reference to the appended claims, which may serve as an additional summary of the disclosure.

In various embodiments, systems and/or computer systems are disclosed that comprise a computer-readable storage medium having program instructions embodied therewith, and one or more processors configured to execute the program instructions to cause the systems and/or computer systems to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer-readable storage medium are disclosed, wherein the computer-readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIGS. 8A-8C illustrate example interactive graphical user interfaces related to data discovery for a data access request user and/or data asset owner user, among others, according to one or more embodiments;

FIGS. 9A-9F illustrate example interactive graphical user interfaces related to a data access request user, among others, according to one or more embodiments.

DETAILED DESCRIPTION

Figure 1:
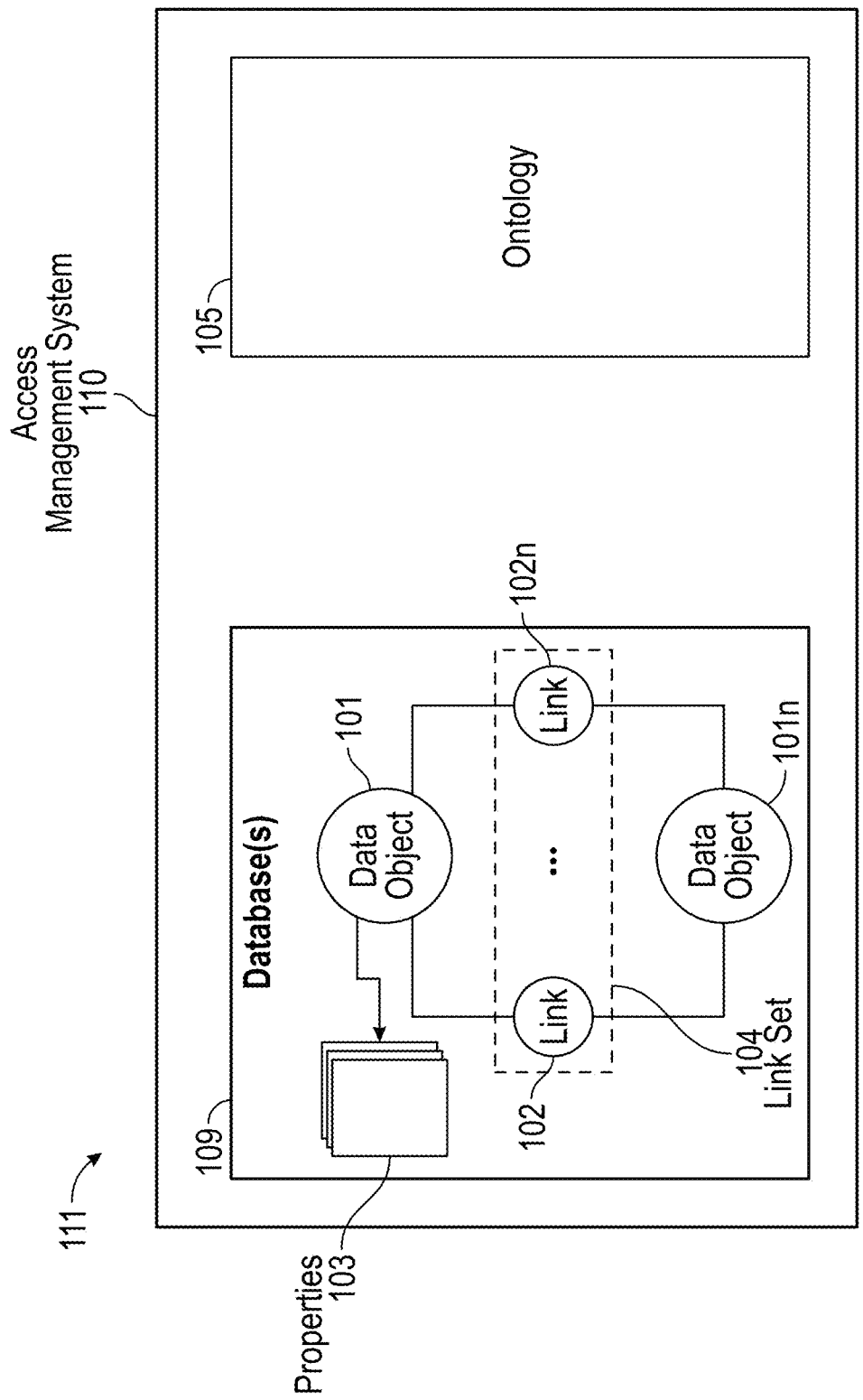
FIG. 1 shows a block diagram illustrating an example access management system, including an example object-centric conceptual data model, according to one or more embodiments of the present disclosure.

Although certain preferred embodiments and examples are disclosed below, the inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

I. Overview

As noted above, in general, access to data assets may be managed by assigning authentication credentials (e.g., usernames and passwords) to users. Computer administrators (e.g., data or information governance administrators) may further impose authorization restrictions specifying which users or groups of users can read, write, or modify a data asset. But sharing of data assets is not addressed by such authentication and authorization. For example, typical data systems may not include mechanisms and user interfaces for designating data assets for sharing (e.g., for sharing between organizations), discovery of shared data assets, tracking of requests for access to shared data assets, sharing of data assets, filtering of shared data assets, tracking the lineage or provenance of data assets, and revoking access to shared data assets (e.g., data assets shared between organizations), among other functionality.

A computer system is provided for sharing data assets, including optionally sharing across organizations. Advantageously, the system may provide technical mechanisms and interactive graphical user interfaces that address one or more, or all, of the previously mentioned deficiencies of typical data systems. In particular, the system may provide technical mechanisms and interactive graphical user interfaces that enable designating data assets for sharing, discovery of shared data assets, tracking of requests for access to shared data assets, sharing of data assets, filtering of shared data assets, tracking the lineage or provenance of data assets, and revoking access to shared data assets, among other functionality.

The system may advantageously bring data governance to the forefront, providing structure to previously unstructured governance metadata using data objects (also referred to herein simply as "objects"). Advantageously, through the use of objects, governance can be integrated into a "data sharing framework" such that users cannot share or access shared data without proceeding though a well-defined process that can: (1) improve data owners' visibility into where data is being shared and how data is being used, (2) aid in accountability by providing well-defined roles and capturing metadata that is useful for audit, and (3) enable revoking of sharing permissions and time bounds on permissions, among other advantages.

The system includes generating objects associated with users, data assets, shared data assets, and data access requests, among other objects. "Shared data asset" objects include metadata associated with a shared data asset, including, for example, schema, update frequencies, owners, tags, approvers, column identifiers, column descriptions, derivation (also referred to herein as provenance or lineage), scoping or filtering, and the like. "Data access request" objects include metadata associated with a request to access a data asset (including a shared data asset), including, for example, forms, conversations, updates, approvals, re-approvals, statuses, versions, and the like. Such data access request objects may be version controlled. Storage of metadata associated with the various aspects of the system in the various objects can advantageously enable investigation, auditing, and automated document generation to be used for legal documentation (e.g., Data Protection Impact Assessments ("DPIAs") and data sharing Memorandums of Understanding ("MoUs").

The system may store data assets in various namespaces (also referred to herein as workspaces), and sharing of data and data assets may be accomplished by updating the namespaces associated with a given data asset. A namespace may comprise various file systems, databases, data stores, and/or the like. Advantageously, the system may enable sharing of data assets across organizations. Advantageously, the system may integrate the data sharing functionality of the system with purpose-based data access aspects as described herein and also in the '465 Publication.

Further, according to various embodiments, various interactive graphical user interfaces are provided for allowing various types of users interact with the systems and methods described herein to, for example, generate, review, and/or modify data asset objects, shared data asset objects, data access request objects, and/or the like.

The following is an example workflow of the system: A data access request user searches for a desirable shared data asset. The data access request user identifies shared data assets for inclusion within the scope of a potential data access request. As part of the identification of shared data assets for inclusion, data access request user may determine any relevant granular access restrictions (e.g., geography or role-based restrictions). Data access request user creates a new data access request, which is a request to access the shared data asset, causing the generation of one or more data access request objects. Data access request user creates one or more new data access request objects by requesting use of the shared data asset from shared data asset owner user and providing justification and legal basis. Related metadata is recorded with the data access request objects. Following an assessment, the shared data asset owner user approves the use of shared data asset under the data access request. The approval is recorded with the data access request object as metadata. A namespace associated with the shared data asset is updated to provide access to the shared data asset by the data access request user. As similar workflow may allow a data asset owner user to share a data asset by, for example, creating a shared data asset object, which may include various scoping or filtering, as described herein.

II. Terms

To facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Data Asset: Any data item or group of data items. May include data and items that can be accessed by a user through a computer system. Non-limiting examples include files, folders, computing machines, memory, processors, servers, hard drives, databases, laptops, RSA tokens, and/or the like. Also referred to herein as "resources", "computer resources", or "datasets".

Data Object or Object: A data container for information representing specific things that have a number of definable properties. For example, a data object can represent an entity such as a person or user, a place, a group, an organization, a resource, a data asset, a request, a purpose, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g., metadata about the object) may be represented in one or more properties.

Object Type: A type of a data object (e.g., user, data asset, data access request, and the like). Object types may be defined by an ontology and may be modified or updated to include additional object types. An object definition (e.g., in an ontology) may include how the object is related to other objects, such as being a sub-object type of another object type (e.g., an agent may be a sub-object type of a person object type), and the properties the object type may have.

III. Example Object Centric Data Model

To provide a framework for the following discussion of specific systems and methods described herein, an example access management system 110 using an ontology 105 will now be described. The access management system 110 is described in the context of an example computing environment 111. This description is provided for the purpose of providing an example and is not intended to limit the techniques to the example data model, the example access management system, or the example access management system's use of an ontology to represent information.

In some embodiments, a body of data is conceptually structured according to an object-centric data model represented by ontology 105. The conceptual data model is independent of any particular database used for durably storing one or more database(s) 109 based on the ontology 105. For example, each object of the conceptual data model may correspond to one or more rows in a relational database or an entry in Lightweight Directory Access Protocol (LDAP) database, or any combination of one or more databases.

FIG. 1 shows a block diagram illustrating an example access management system, including an example object-centric conceptual data model, according to one or more embodiments of the present disclosure. An ontology 105, as noted above, may include stored information providing a data model for storage of data in the database 109. The ontology 105 may be defined by one or more object types, which may each be associated with one or more property types. At the highest level of description, data object 101 is a container for information representing things in the world. For example, data object 101 can represent an entity such as a person or user, a place, a group, an organization, a resource, a data asset, a request, a purpose, a link, or other noun. Data object 101 can represent an event that happens at a point in time or for a duration. Data object 101 can represent a document or other unstructured data source such as an e-mail message, a news report, or a written paper or article. Each data object 101 is associated with a unique identifier that uniquely identifies the data object within the access management system.

Different types of data objects may have different property types. For example, a "Person" data object might have an "Eye Color" property type and an "Event" data object might have a "Date" property type. Each property 103 as represented by data in the access management system 110 may have a property type defined by the ontology 105 used by the database 105.

Objects may be instantiated in the database 109 in accordance with the corresponding object definition for the particular object in the ontology 105. For example, a specific folder (e.g., an object of type "Data Asset") at "C: \Folder" (e.g., a property of type "directory") may be stored in the database 109 as a data asset object metadata as defined within the ontology 105.

The data objects defined in the ontology 105 may support property multiplicity. In particular, a data object 101 may be allowed to have more than one property 103 of the same property type. For example, a "Person" data object might have multiple "Address" properties or multiple "Name" properties.

Each link 102 represents a connection between two data objects 101. In some embodiments, the connection can be through a relationship, an event, a property, or through matching properties. A relationship connection may be asymmetrical or symmetrical. For example, "Person" data object A may be connected to "Person" data object B by a "Boss Of" relationship (where "Person" data object B has an asymmetric "Boss Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Office" data object representing a particular business office if they worked at the same place, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing accountants at a finance firm, may both have a "CPA Qualified" property that indicates that both of them have CPA licenses. If both people work at the same office, then their "Business Address" properties likely contain similar, if not identical property values. In some embodiments, a link between two data objects may be established based on similar or matching properties (e.g., property types and/or property values) of the data objects. These are just some examples of the types of connections that may be represented by a link, and other types of connections may be represented; embodiments are not limited to any particular types of connections between data objects. For example, a document might contain references to two different objects. For example, a document may contain a reference to an event (one object), and a person (a second object). A link between these two objects may represent a connection between these two entities through their co-occurrence within the same document.

Each data object 101 can have multiple links with another data object 101 to form a link set. Each link 102 as represented by data in a database may have a link type defined by the database ontology used by the database.

Figure 2A:
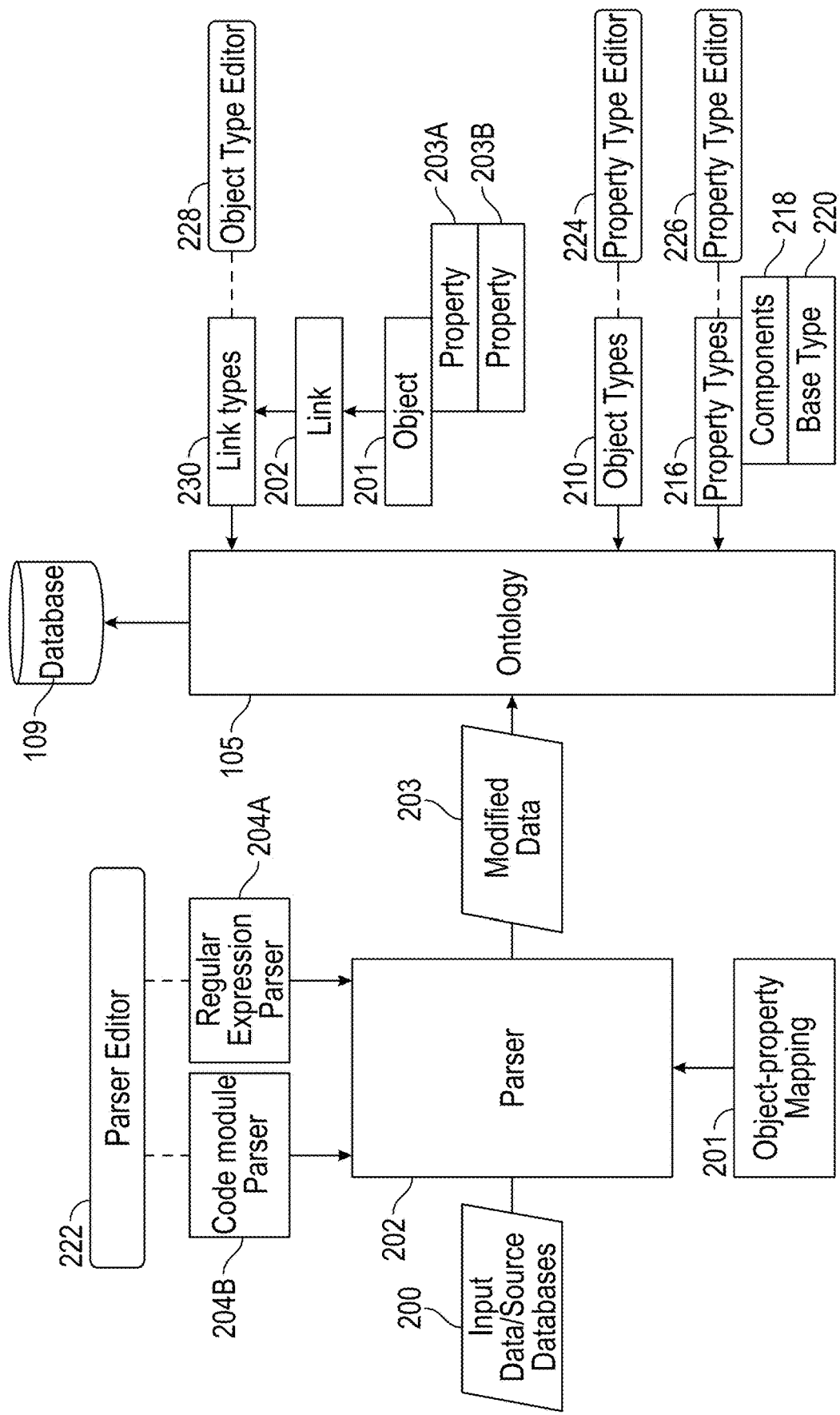
FIG. 2A shows a block diagram illustrating example components and data that may be used in identifying and storing data according to an ontology, according to one or more embodiments.

FIG. 2A shows a block diagram illustrating example components and data that may be used in identifying and storing data according to an ontology, according to one or more embodiments. In this example, the ontology may be configured, and data in the data model populated, by a system of parsers and ontology configuration tools. In the embodiment of FIG. 2A, input data 200 is provided to parser 202. The input data may comprise data from one or more sources. For example, a rental car institution may have one or more databases with information on calendar entries, rental cars, and people. The databases may contain a variety of related information and attributes about each type of data, such as a "date" for a calendar entry, an address for a person, and a date for when a rental car is rented. The parser 202 is able to read a variety of source input data types and determine which type of data it is reading.

In accordance with the discussion above, the example ontology 105 comprises stored information providing the data model of data stored in database 109, and the ontology is defined by one or more object types 210, one or more property types 216, and one or more link types 230. Based on information determined by the parser 202 or other mapping of source input information to object type, one or more data objects 101 may be instantiated in the database 109 based on respective determined object types 210, and each of the objects 101 has one or more properties 103 that are instantiated based on property types 216. Two data objects 101 may be connected by one or more links 102 that may be instantiated based on link types 230. The property types 216 each may comprise one or more data types 218, such as a string, number, and/or the like. Property types 216 may be instantiated based on a base property type 220. For example, a base property type 220 may be "Locations" and a property type 216 may be "Home."

In some embodiments, an administrator of the system (e.g., a user with the proper role and/or permissions) uses an object type editor 224 to create and/or modify the object types 210 and define attributes of the object types. In some embodiments, an administrator of the system uses a property type editor 226 to create and/or modify the property types 216 and define attributes of the property types. In some embodiments, an administrator of the system uses link type editor 228 to create the link types 230. Alternatively, other programs, processes, or programmatic controls may be used to create link types and property types and define attributes, and using editors is not required.

In some embodiments, creating a property type 216 using the property type editor 226 involves defining at least one parser definition using a parser editor 222. A parser definition comprises metadata that informs parser 202 how to parse input data 200 to determine whether values in the input data can be assigned to the property type 216 that is associated with the parser definition. In an embodiment, each parser definition may comprise a regular expression parser 204A or a code module parser 204B. In other embodiments, other kinds of parser definitions may be provided using scripts or other programmatic elements. Once defined, both a regular expression parser 204A and a code module parser 204B can provide input to parser 202 to control parsing of input data 200.

Using the data types defined in the ontology, input data 200 may be parsed by the parser 202 determine which object type 210 should receive data from a record created from the input data, and which property types 216 should be assigned to data from individual field values in the input data. Based on the object-property mapping 201 (including properties 208A, 208B), the parser 202 selects one of the parser definitions that is associated with a property type in the input data. The parser parses an input data field using the selected parser definition, resulting in creating new or modified data 203. The new or modified data 203 is added to the database 109 according to ontology 105 by storing values of the new or modified data in a property of the specified property type. As a result, input data 200 having varying format or syntax can be created in database 109. The ontology 105 may be modified at any time using object type editor 224, property type editor 226, and link type editor 228, or under program control without human use of an editor. Parser editor 222 enables creating multiple parser definitions that can successfully parse input data 200 having varying format or syntax and determine which property types should be used to transform input data 200 into new or modified input data 203.

IV. Example Data Management System

Figure 2B:
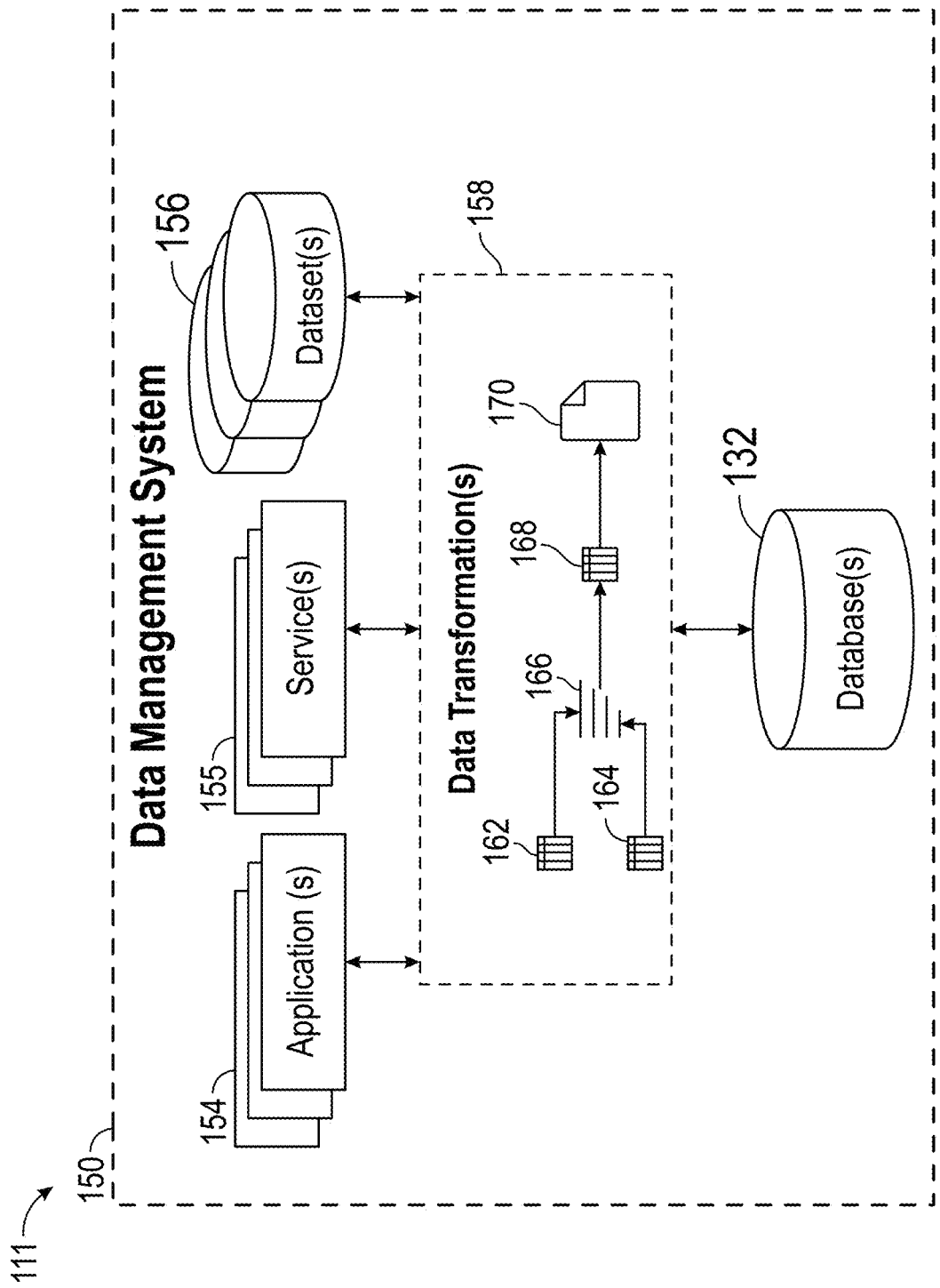
FIG. 2B shows a block diagram illustrating an example data management system, according to one or more embodiments.

FIG. 2B shows a block diagram illustrating an example data management system 150, according to one or more embodiments. In particular, the data management system 150 can be used in the context of computing environment 111 along with the access management system 110 described above with respect to FIG. 1. In the embodiments of FIG. 2B, computing environment 111 can be similar to, overlap with, and/or be used in conjunction with the computing environment 111 of FIG. 1. For example, the computing environment 111 can include a database 132, which may be similar to the database 109 in the computing environment 111 of FIG. 1. However, the computing environment 111 can also include the data management system 150.

The example data management system 150 includes one or more applications 154, one or more services 155, one or more initial datasets 156, and a data transformation process 158 (also referred to herein as a build process). The example data management system 150 can include a data pipeline system. The data management system 150 can transform data and record the data transformations. The one or more applications 154 can include applications that enable users to view datasets, interact with datasets, filter datasets, and/or configure dataset transformation processes or builds. The one or more services 155 can include services that can trigger the data transformation builds and application programming interface ("API") services for receiving and transmitting data. The one or more initial datasets 156 can be automatically retrieved from external sources and/or can be manually imported by a user. The one or more initial datasets 156 can be in many different formats such as a tabular data format (SQL, delimited, or a spreadsheet data format), a data log format (such as network logs), or time series data (such as sensor data).

The data management system 150, via the one or more services 155, can apply the data transformation process 158. An example data transformation process 158 is shown. The data management system 150 can receive one or more initial datasets 162, 164. The data management system 150 can apply a transformation to the dataset(s). For example, the data management system 150 can apply a first transformation 166 to the initial datasets 162, 164, which can include joining the initial datasets 162, 164 (such as or similar to a SQL JOIN), and/or a filtering of the initial datasets 162, 164. The output of the first transformation 166 can include a modified dataset 168. A second transformation of the modified dataset 168 can result in an output dataset 170, such as a report or a joined table in a tabular data format that can be stored in the database 132. Each of the steps in the example data transformation process 158 can be recorded by the data management system 150 and made available as a resource or data asset. For example, a data asset can include a dataset and/or a dataset item, a transformation, or any other step in a data transformation process. As mentioned above, the data transformation process or build 158 can be triggered by the data management system 150, where example triggers can include nightly build processes, detected events, or manual triggers by a user. Additional aspects of data transformations and the data management system 150 are described in further detail below.

The techniques for recording and transforming data in the data management system 150 may include maintaining an immutable history of data recording and transformation actions such as uploading a new dataset version to the data management system 150 and transforming one dataset version to another dataset version. The immutable history is referred to herein as "the catalog." The catalog may be stored in a database. Preferably, reads and writes from and to the catalog are performed in the context of ACID-compliant transactions supported by a database management system. For example, the catalog may be stored in a relational database managed by a relational database management system that supports atomic, consistent, isolated, and durable (ACID) transactions.

The catalog can include versioned immutable "datasets." More specifically, a dataset may encompass an ordered set of conceptual dataset items. The dataset items may be ordered according to their version identifiers recorded in the catalog. Thus, a dataset item may correspond to a particular version of the dataset. A dataset item may represent a snapshot of the dataset at a particular version of the dataset. As a simple example, a version identifier of '1' may be recorded in the catalog for an initial dataset item of a dataset. If data is later added to the dataset, a version identifier of '2' may be recorded in the catalog for a second dataset item that conceptually includes the data of the initial dataset item and the added data. In this example, dataset item '2' may represent the current dataset version and is ordered after dataset item '1'.

As well as being versioned, a dataset may be immutable. That is, when a new version of the dataset corresponding to a new dataset item is created for the dataset in the system, pre-existing dataset items of the dataset are not overwritten by the new dataset item. In this way, pre-existing dataset items (e.g., pre-existing versions of the dataset) are preserved when a new dataset item is added to the dataset (e.g., when a new version of the dataset is created). Note that supporting immutable datasets is not inconsistent with pruning or deleting dataset items corresponding to old dataset versions. For example, old dataset items may be deleted from the system to conserve data storage space.

A version of dataset may correspond to a successfully committed transaction against the dataset. In these embodiments, a sequence of successfully committed transactions against the dataset corresponds to a sequence of dataset versions of the dataset (e.g., a sequence of dataset items of the dataset).

A transaction against a dataset may add data to the dataset, edit existing data in the dataset, remove existing data from the dataset, or a combination of adding, editing, or removing data. A transaction against a dataset may create a new version of the dataset (e.g., a new dataset item of the dataset) without deleting, removing, or modifying pre-existing dataset items (e.g., without deleting, removing, or modifying pre-existing dataset versions). A successfully committed transaction may correspond to a set of one or more files that contain the data of the dataset item created by the successful transaction. The set of files may be stored in a file system.

In the catalog, a dataset item of a dataset may be identified by the name or identifier of the dataset and the dataset version corresponding to the dataset item. In a preferred embodiment, the dataset version corresponds an identifier assigned to the transaction that created the dataset version. The dataset item may be associated in the catalog with the set of files that contain the data of the dataset item. In a preferred embodiment, the catalog treats the set of files as opaque. That is, the catalog itself may store paths or other identifiers of the set of files but may not otherwise open, read, or write to the files.

In sum, the catalog may store information about datasets. The information may include information identifying different versions (e.g., different dataset items) of the datasets. In association with information identifying a particular version (e.g., a particular dataset item) of a dataset, there may be information identifying one or more files that contain the data of the particular dataset version (e.g., the particular dataset item).

The catalog may store information representing a non-linear history of a dataset. Specifically, the history of a dataset may have different dataset branches. Branching may be used to allow one set of changes to a dataset to be made independent and concurrently of another set of changes to the dataset. The catalog may store branch names in association with dataset version identifiers for identifying dataset items that belong to a particular dataset branch.

The catalog may provide dataset provenance at the transaction level of granularity. As an example, suppose a transformation is executed in the data management system 150 multiple times that reads data from dataset A, reads data from dataset B, transforms the data from dataset A and the data from dataset B in some way to produce dataset C. As mentioned, this transformation may be performed multiple times. Each transformation may be performed in the context of a transaction. For example, the transformation may be performed daily after datasets and B are updated daily in the context of transactions. The result being multiple versions of dataset A, multiple versions of dataset B, and multiple versions of dataset C as a result of multiple executions of the transformation. The catalog may contain sufficient information to trace the provenance of any version of dataset C to the versions of datasets A and B from which the version of dataset C is derived. In addition, the catalog may contain sufficient information the trace the provenance of those versions of datasets A and B to the earlier versions of datasets A and B from which those versions of datasets A and B were derived.

The provenance tracking ability is the result of recording in the catalog for a transaction that creates a new dataset version, the transaction or transactions that the given transaction depends on (e.g., is derived from). The information recorded in the catalog may include an identifier of each dependent transaction and a branch name of the dataset that the dependent transaction was committed against.

According to some embodiments, provenance tracking extends beyond transaction level granularity to column level granularity. For example, suppose a dataset version A is structured as a table of two columns and a dataset version B is structured as a table of five columns. Further assume, column three of dataset version B is computed from column one of dataset version A. In this case, the catalog may store information reflecting the dependency of column three of dataset version B on column one of dataset version A.

The catalog may also support the notion of permission transitivity. For example, suppose the catalog records information for two transactions executed against a dataset referred to in this example as "Transaction 1" and Transaction 2". Further suppose a third transaction is performed against the dataset which is referred to in this example as "Transaction 3." Transaction 3 may use data created by Transaction 1 and data created by Transaction 2 to create the dataset item of Transaction 3. After Transaction 3 is executed, it may be decided according to organizational policy that a particular user should not be allowed to access the data created by Transaction 2. In this case, as a result of the provenance tracking ability, and in particular because the catalog records the dependency of Transaction 3 on Transaction 2, if permission to access the data of Transaction 2 is revoked from the particular user, permission to access the data of Transaction 3 may be transitively revoked from the particular user.

The transitive effect of permission revocation (or permission grant) can apply to an arbitrary number of levels in the provenance tracking. For example, returning to the above example, permission may be transitively revoked for any transaction that depends directly or indirectly on the Transaction 3.

According to some embodiments, where provenance tracking in the catalog has column level granularity. Then permission transitivity may apply at the more fine-grained column level. In this case, permission may be revoked (or granted) on a particular column of a dataset and based on the column-level provenance tracking in the catalog, permission may be transitively revoked on all direct or indirect descendent columns of that column.

A build service can manage transformations which are executed in the system to transform data. The build service may leverage a directed acyclic graph data (DAG) structure to ensure that transformations are executed in proper dependency order. The graph can include a node representing an output dataset to be computed based on one or more input datasets each represented by a node in the graph with a directed edge between node(s) representing the input dataset(s) and the node representing the output dataset. The build service traverses the DAG in dataset dependency order so that the most upstream dependent datasets are computed first. The build service traverses the DAG from the most upstream dependent datasets toward the node representing the output dataset rebuilding datasets as necessary so that they are up-to-date. Finally, the target output dataset is built once all of the dependent datasets are up-to-date.

The data management system 150 can support branching for both data and code. Build branches allow the same transformation code to be executed on multiple branches. For example, transformation code on the master branch can be executed to produce a dataset on the master branch or on another branch (e.g., the develop branch). Build branches also allow transformation code on a branch to be executed to produce datasets on that branch. For example, transformation code on a development branch can be executed to produce a dataset that is available only on the development branch. Build branches provide isolation of re-computation of graph data across different users and across different execution schedules of a data pipeline. To support branching, the catalog may store information represents a graph of dependencies as opposed to a linear dependency sequence.

The data management system 150 may enable other data transformation systems to perform transformations. For example, suppose the system stores two "raw" datasets R1 and R2 that are both updated daily (e.g., with daily web log data for two web services). Each update creates a new version of the dataset and corresponds to a different transaction. The datasets are deemed raw in the sense that transformation code may not be executed by the data management system 150 to produce the datasets. Further suppose there is a transformation A that computes a join between datasets R1 and R2. The join may be performed in a data transformation system such a SQL database system, for example. More generally, the techniques described herein are agnostic to the particular data transformation engine that is used. The data to be transformed and the transformation code to transform the data can be provided to the engine based on information stored in the catalog including where to store the output data.

According to some embodiments, the build service supports a push build. In a push build, rebuilds of all datasets that depend on an upstream dataset or an upstream transformation that has been updated are automatically determined based on information in the catalog and rebuilt. In this case, the build service may accept a target dataset or a target transformation as an input parameter to a push build command. The build service than determines all downstream datasets that need to be rebuilt, if any.

As an example, if the build service receives a push build command with dataset R1 as the target, then the build service would determine all downstream datasets that are not up-to-date with respect to dataset R1 and rebuild them. For example, if dataset D1 is out-of-date with respect to dataset R1, then dataset D1 is rebuilt based on the current versions of datasets R1 and R2 and the current version of transformation A. If dataset D1 is rebuilt because it is out-of-date, then dataset D2 will be rebuilt based on the up-to-date version of dataset D1 and the current version of transformation B and so on until all downstream dataset of the target dataset are rebuilt. The build service may perform similar rebuilding if the target of the push build command is a transformation.

The build service may also support triggers. In this case, a push build may be considered a special case of a trigger. A trigger, generally, is a rebuild action that is performed by the build service that is triggered by the creation of a new version of a dataset or a new version of a transformation in the system.

A schema metadata service can store schema information about files that correspond to transactions reflected in the catalog. An identifier of a given file identified in the catalog may be passed to the schema metadata service and the schema metadata service may return schema information for the file. The schema information may encompass data schema related information such as whether the data in the file is structured as a table, the names of the columns of the table, the data types of the columns, user descriptions of the columns, and/or the like.

The schema information can be accessible via the schema metadata service may versioned separately from the data itself in the catalog. This allows the schemas to be updated separately from datasets and those updates to be tracked separately. For example, suppose a comma separated file is uploaded to the system as particular dataset version. The catalog may store in association with the particular dataset version identifiers of one or more files in which the CSV data is stored. The catalog may also store in association with each of those one or more file identifiers, schema information describing the format and type of data stored in the corresponding file. The schema information for a file may be retrievable via the scheme metadata service given an identifier of the file as input. Note that this versioning scheme in the catalog allows new schema information for a file to be associated with the file and accessible via the schema metadata service. For example, suppose after storing initial schema information for a file in which the CSV data is stored, updated the schema information is stored that reflects a new or better understanding of the CSV data stored in the file. The updated schema information may be retrieved from the schema metadata service for the file without having to create a new version of the CSV data or the file in which the CSV data is stored.

When a transformation is executed, the build service may encapsulate the complexities of the separate versioning of datasets and schema information. For example, suppose transformation A described above in a previous example that accepts the dataset R1 and dataset R2 as input is the target of a build command issued to the build service. In response to this build command, the build service may determine from the catalog the file or files in which the data of the current versions of datasets R1 and R2 is stored. The build service may then access the schema metadata service to obtain the current versions of the schema information for the file or files. The build service may then provide all of identifiers or paths to the file or files and the obtained schema information to the data transformation engine to execute transformation A. The underlying data transformation engine interprets the schema information and applies it to the data in the file or files when executing transformation A.

The various data assets (e.g., files, data items, datasets, portions of datasets, transformations, and/or the like) of the data management system 150 may also be stored in the databases 132.

The data management system 150 can include various permissioning functionalities. For example, the data management system 150 can implements access control lists and/or other permissioning functionality that can enable highly granular permissioning of data assets (e.g., files, data items, datasets, portions of datasets, transformations, and/or the like). The permissioning may include, for example, specific permissions for read/write/modify, and/or the like, which may be applicable to specific users, groups of users, roles, and/or the like.

In an implementation, the data management system 150 includes "projects", which comprise groups of data assets. Users granted access to a given project are also thereby granted access to all data assets within that project, subject to further permissioning such as read/write/modify, as mentioned above. As further described herein, in an implementation the access management system 110 expands the permissioning functionality of the data management system 150 by associating "purposes" (e.g., as defined by purpose objects) of the access management system 110 with "projects" of the data management system 150. Thus, for example, a user may be granted access to the data assets of a project if they are approved to a particular purpose. Further details regarding granting access to purposes are provided herein.

V. Example Access Management System and Related Computing Environment

Figure 3:
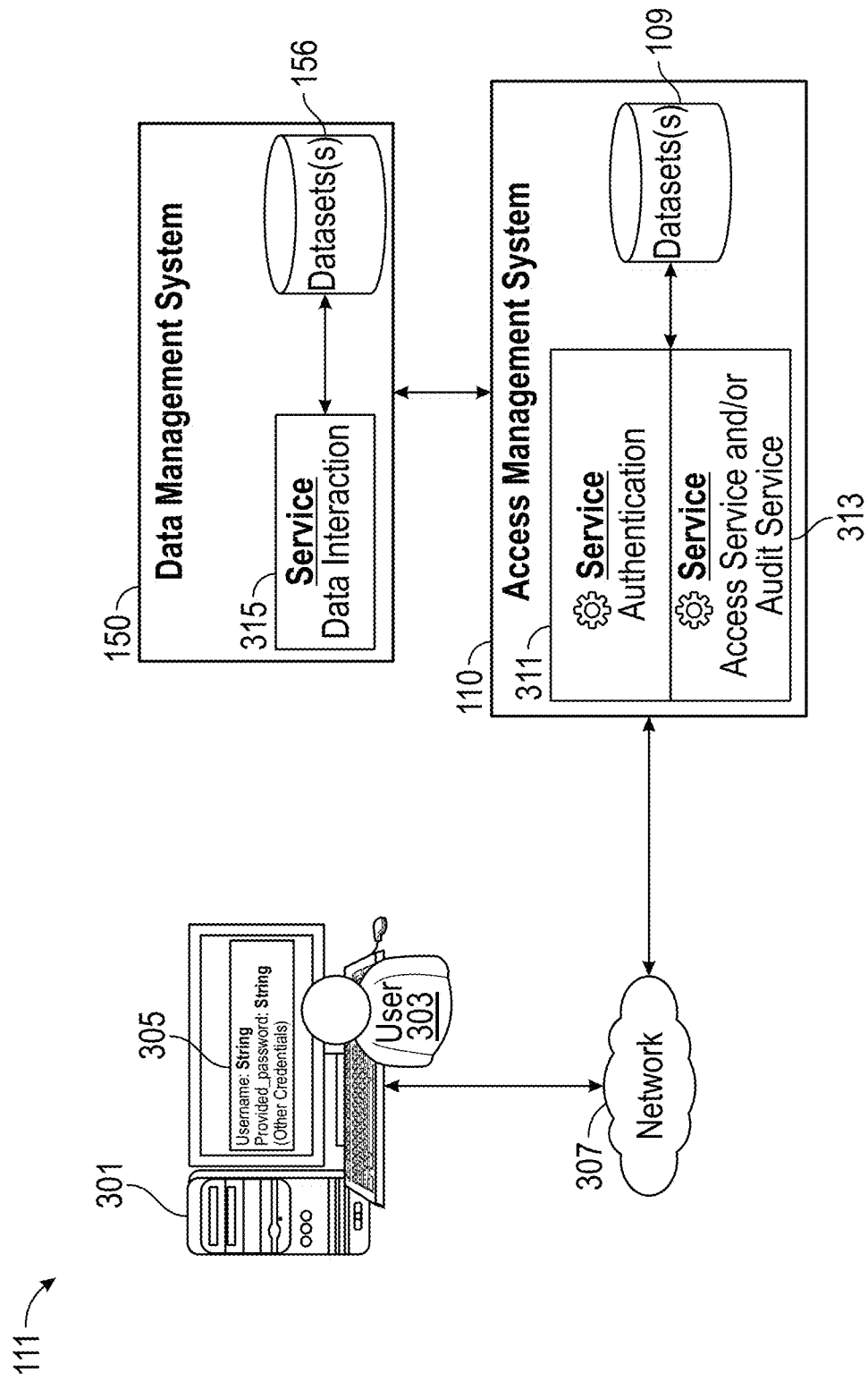
FIG. 3 shows an example block diagram including a computing environment for controlling access to electronic data assets, according to one or more embodiments.

FIG. 3 shows an example block diagram including a computing environment 111 for controlling access to electronic data assets, according to one or more embodiments. The computing environment 111 includes the access management system 110 and the data management system 150, examples of which are described above in reference to FIGS. 1 and 2A-2B. FIG. 3 further shows an example computer system 301 being used by a user 303, and a network 307 enabling communication between the computer system 301 and the access management system 110. As shown, the access management system 110 and the data management system 150 may also be in communication with each other via direct connection, or one of more computer networks. As shown, the access management system 110 may include an authentication service 311 and an access service and/or audit service 313 (generally referred to herein simply as access service 313), and the data management system 150 may include a data interaction service 315.

In various embodiments, the various aspects of the access management system 110 and the data management system 150 may be implemented in various ways. For example, the access management system 110 and the data management system 150 may be implemented as a single computing system, and/or various functions or services of the two may be split up and/or arranged differently from that shown in the example computing environment 111 of FIG. 3. Thus, for example, while in FIG. 3 dataset(s) 156 and database(s) 109 are shown as being implemented in the respective data management system 150 and access management system 110, in other implementations the datasets/databases may be combined, separated into additional datasets/databases, and/or the like. Similarly, the ontology 105, and the database(s) 132 may be combined and/or separated, and/or combined with one or more of the dataset(s) and database(s) 109. As another example, the various services of the data management system 150 and access management system 110 may be combined and/or separated in additional services, and/or may be implemented in different ones of the various systems of the present disclosure. However, for the purpose of providing a concise description in the present disclosure, the various functionalities are described in reference to the example implementation shown in the computing environment 111 of FIG. 3.

As used herein, the term "system" generally refers to the access management system 110, but may also include various aspects of the data management system 150 and/or other computer systems of the present disclosure.

In general, and as further described herein, the authentication service 311 may authenticate users who access the system, e.g., via a username and password, and/or other appropriate authentication mechanisms. Also, in general and as further described herein, the access service 313 may provide, to various users, sharing-based and purpose-based access to data assets (e.g., data items, datasets, and/or the like, which may be stored in the dataset(s) 156 and/or another data store or database of the system), and may also provide various functionalities for sharing, permissioning, generating, and/or modifying objects (e.g., data access request objects, purpose objects, data asset objects, shared data asset objects, purpose access request objects, data access request object, various user objects, and/or the like), providing interactive user interfaces, and/or the like. Also, in general and as further described herein, the data interaction service 315 may provide various users with interactive user interfaces for interacting with data assets, e.g., shared data assets and/or associated with a purpose/"project".

The example computer system 301, with which a user 303 may interact, communicates with the system via the network 307 (e.g., a local or extended network, which may include the Internet, and which may include multiple networks that may variously be wired or wireless) to, for example, transmit authentication credentials 305, receive and/or send data and/or commands, provide various interactive user interface functionality to the user. The example computer system 301 is representative of multiple computer systems that may communicate with the access management system 110 and/or data management system 150, and which may be used by various types of users for the various functionality as described herein.

VI. Authentication

A user can be authenticated using authentication credentials, e.g., based on a username and password provided by the user. The user 303 may use a variety of different types of computer systems 301 to access various resources. The computer system 301 can include a desktop, laptop, terminal, smartphone, smartTV, and/or the like. The user 303 may desire to access a variety of resources, such as files, folders, computing machines, memory, processors, servers, hard drives, databases, laptops, RSA tokens, client badges, and/or the like, including time or job slots for using any of the aforementioned resources/data assets. Access to the resources can be restricted and audited as discussed herein.

The authentication credentials 305 provided by a user can include a username and password. In various embodiments, the authentication credentials 305 can include additional information, such as answers to challenge questions, hardware identifiers, passwords received through a second communication channel via N-factor authentication, time-based authentication data, and/or the like. The authentication credentials 305 can be transmitted through a network 307 to the access management system 110 to authenticate the user 303.

The access management system 110 can use the authentication service 311 to compare the authentication credentials 305 against the authentication credentials of known user objects (e.g., data access request user objects, data asset owner user objects, analyst user objects, purpose sponsor objects, data asset objects, and/or the like) in, e.g., database 109 and/or another database. An example flowchart for the authentication service 311 is discussed in reference to FIG. 4.

The access management system 110 can use an access and/or audit system to manage user access to, and sharing of, various computer resources/data assets. Example flowcharts and functionality for access, sharing, and/or audit services are described, e.g., in reference to FIGS. 5A-5C, 6, and 7, and the various Figures with example interactive graphical user interfaces of the present disclosure.

The database 109 can include a plurality of objects representing known users. The database 109 can additionally include a plurality of other objects, such as shown and described in reference to FIGS. 5A-5C.

The known user object is represented with an object model, and can have a plurality of properties. For example, the known user object can include a property such as "Authen_Info" to indicate information used for authentication credentials. The authentication credentials can include a username, an encrypted password, encryption scheme, and/or the like. The authentication credentials can include string values, other object types, and/or references to other resources such as an encrypted database.

The known user object can also include properties such as "Author Info" to indicate various permissions that the known user has any type of authorization for. In some embodiments, the authorizations can specify permissions such as objects and/or types of objects the user has authorization to read from, write to, modify, and/or otherwise access. In some embodiments, the property indicating authorizations of the known user object can be omitted, and authorizations can be handled at an operating system level or other level. Other properties can indicate linked objects that represent, for example, shared data assets, data access requests, and/or the like, as described herein. Although the object model includes example types/objects associated with each property, it will be understood that various embodiments can use different data types and/or types of objects for the properties. For example, the Authen_Info can be an object indicating authentication credentials, a String, a double, and/or the like. As further explained with respect to FIGS. 5A-5C, any of the properties of the various objects can additionally or alternatively be indicated using links.

Figure 4:
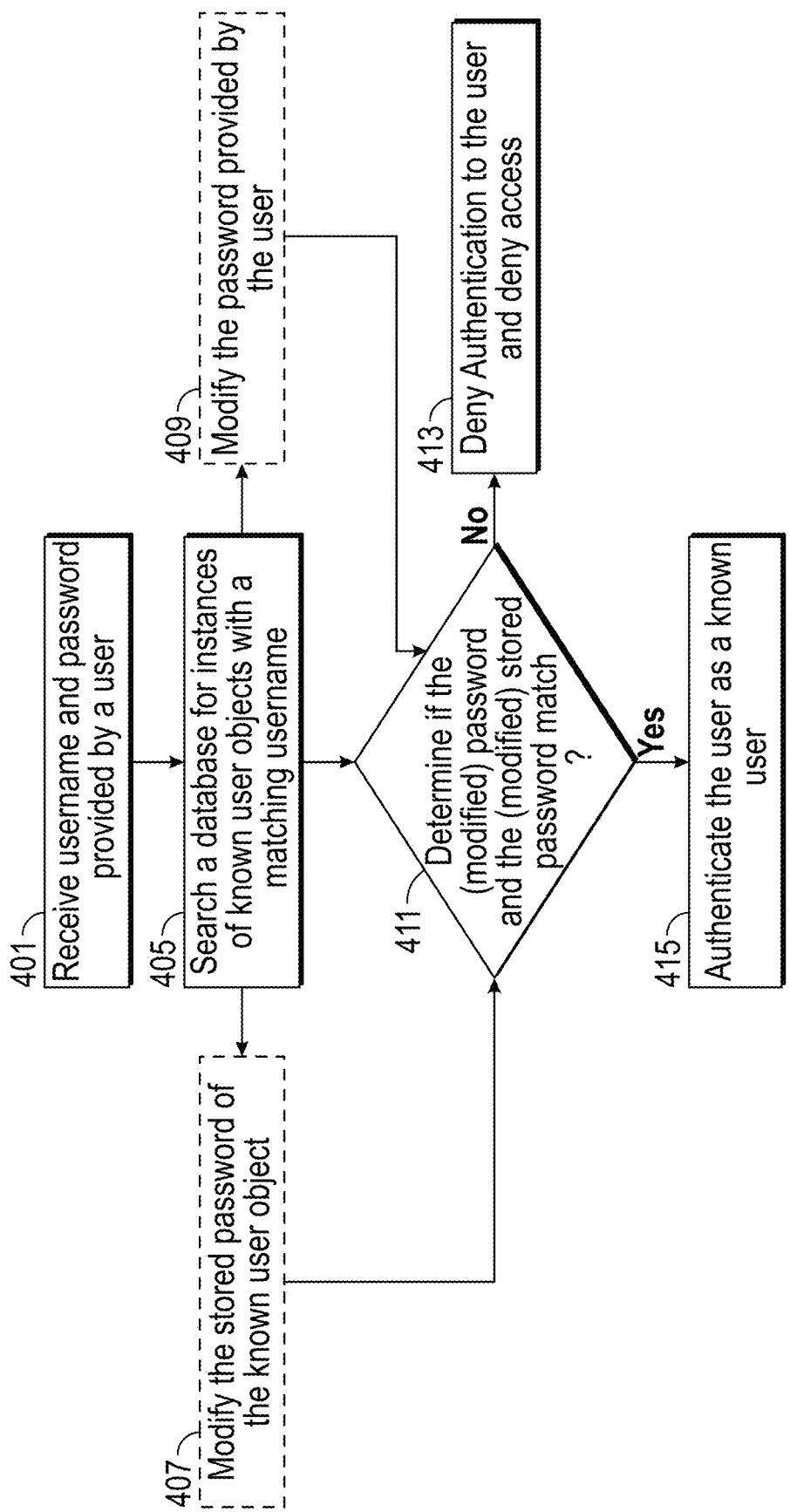
FIG. 4 shows a block diagram illustrating an example authentication service, according to one or more embodiments.

FIG. 4 shows a block diagram illustrating an example authentication service (e.g., which may be implemented by authentication service 311), according to one or more embodiments. At block 401, a username and password provided by a user can be received. In some embodiments, other authentication credentials can be received as well.

At block 405, a database (such as database 109 of FIG. 3) can be searched for instances of known user objects that match the username provided by the user. In some embodiments, the search can be performed by referencing an index. A matching known user object can be found. In some embodiments, the searching for a matching user can be performed at the operating system level with or without the use of objects.

At block 411, it can be determined if the password provided by the user and the stored password for the matching known user match. In various embodiments, either one or both of the stored password or the password provided by the user may be modified, at block 407 and at block 409 respectively, before the comparison is performed at block 411 to determine a match. Modifications to passwords can include encryption, decryption, salting, hashing, and/or the like.

If at block 411, the password provided by the user and the stored password of the known user does not match, then at block 413, the user is denied authentication and denied access. If at block 411, the password provided by the user and the stored password of the known user do match, at block 415, the user can be authenticated as a known user. Further access to and sharing of resources/data assets for authenticated users is discussed in reference to, e.g., FIGS. 5A-5C, 6, and 7, and the various Figures with example interactive graphical user interfaces of the present disclosure.

VII. Example Access to Data Assets and Associated Example Object Model

Figure 5A:
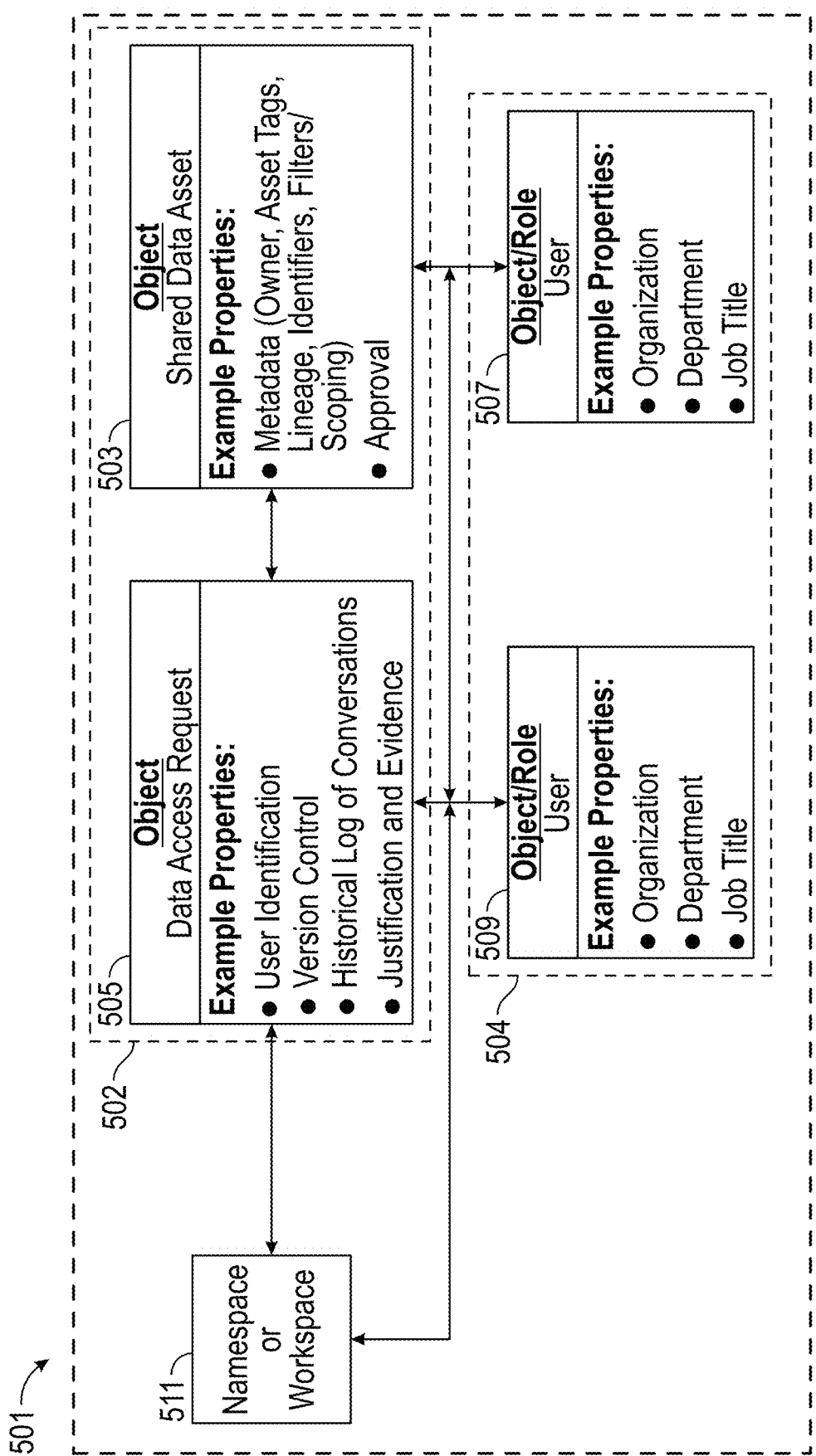
FIGS. 5A-5C show example block diagrams including object models for managing, controlling, or sharing access to electronic data assets, according to one or more embodiments.

After authenticating the identity of a user, the system can then determine which data assets the user is authorized to access, and permissions of the user as related to those data assets. Data asset access in the system of the present disclosure can be based on the justifiable needs of organizations. Data asset access in the system of the present disclosure may also be based on purposes. In various implementations, the system of the present disclosure, including sharing of data assets, can be combined with purpose-based access to data assets. This is further described below, and additional details and examples are described in the '465 Publication. The system uses an object model 501 (e.g., based on an ontology as described above in reference to FIG. 1) for managing or controlling access to, and sharing of, electronic data assets, an example of which is illustrated in FIG. 5A. As shown in FIG. 5A, data object types of the object model include access-related objects 502 and user objects 504. The access-related objects 502 include data access request objects 505, and shared data asset objects 503. The user objects 504 include data asset owner user objects 507 and data access request user objects 509. Further details regarding these various types of objects are described herein.

The various data assets of the system (e.g., data assets stored by the data management system 150) may be associated with, stored in, and/or linked to, one or more namespaces 511. Similarly, the access-related objects and user objects may be associated with, stored in, and/or linked to, one or more namespaces 511 (also referred to herein as workspaces). A namespace may comprise various file systems, databases, data stores, and/or the like. The system may use namespaces to provide permissioned access to data assets. Further, the system may use namespaces to keep track of and maintain access-related objects associated with, and/or linked to user objects. The system may use namespace markings to associate data assets and/or access-related objects to user objects. Sharing of data assets may be accomplished by updating the namespaces (e.g., namespace markings) associated with a given data asset or dataset. For example, in some embodiments, when a shared data asset is shared with a unique data access request user, the system may update the namespace associated with that shared data asset. However, in other embodiments, sharing a shared data asset with a data access request user may involve moving or duplication of the shared data asset into a namespace.

Various users of the system can act in various roles for enabling data sharing, including cross-organizational data sharing. These user roles include, for example, (1) data access request user, who creates data access requests with clear justifications for the requests, and who then accesses and analyzes data; and (2) data asset owner user, who is responsible for one or more data assets, and who reviews data access requests for the data assets that they own, and who shared data assets. Data access request users and data asset owner users each have the ability to assign delegates or administrators for acting on their behalf for various types of requests.

The system may generate objects associated with various users interacting with the system in various roles according to the object model, e.g.: data access request user objects 509, and data asset owner objects 507. As illustrated in FIG. 5A, each instantiation of the various user objects may include various properties, including for example, organization, department, job title, and/or the like. Additional example properties that may be associated with user objects are illustrated in reference to the various Figures with example interactive graphical user interfaces of the present disclosure.

The system may further generate objects associated with sharing data assets (e.g., including cross-organizational justifiable needs) according to the object model, e.g.: shared data asset objects 503 and data access request objects 505. As illustrated in FIG. 5A, each instantiation of a data access request object 505 may include various properties (also referred to herein as metadata), including for example, a link to or identification of the data access request user, justification or legal basis, evidence, documentation, privilege or permissions, forms, conversations, updates, approvals, re-approvals, statuses, versions, and/or the like. Further, each instantiation of a data access request object may be associated with, and/or linked to, a data access request user that may be responsible for managing the data access request, including for example, creating the data access request object, approving data access requests, and/or the like. Further, in various implementations, each instantiation of a data access request object may be associated with, linked to, and/or include a "tag," indicating a particular characteristic of the data access request, and be version controlled. As also illustrated in FIG. 5A, each instantiation of a shared data asset object may include various properties (also referred to herein as metadata), including for example, description, various key attributes, schema, update frequencies, owners, tags, approvers, column identifiers, column descriptions, derivation (also referred to herein as provenance or lineage), scoping or filtering, and/or the like. Each instantiation of a shared data asset object may be associated with, and/or linked to, a data asset owner user that may be responsible for managing the shared data asset, including for example, reviewing data access requests, and/or the like. Further, each instantiation of a shared data asset object may be associated with, linked to, and/or include a data asset. The metadata of the shared data asset object may indicate aspects of the shared data asset. For example, the schema metadata my provide information regarding the format or data schema of the data asset, and the update frequency metadata may provide information regarding the frequency of updates associated with the data asset. Similar information may be provided via the various other metadata. Additionally, in various implementations, each instantiation of a shared data asset object may be associated with, linked to, and/or include resources other than just pure data that may be used by one data access request. Additional example properties that may be associated with data access request objects and shared data asset objects are illustrated in reference to the various Figures with example interactive graphical user interfaces of the present disclosure.

Figure 5B:
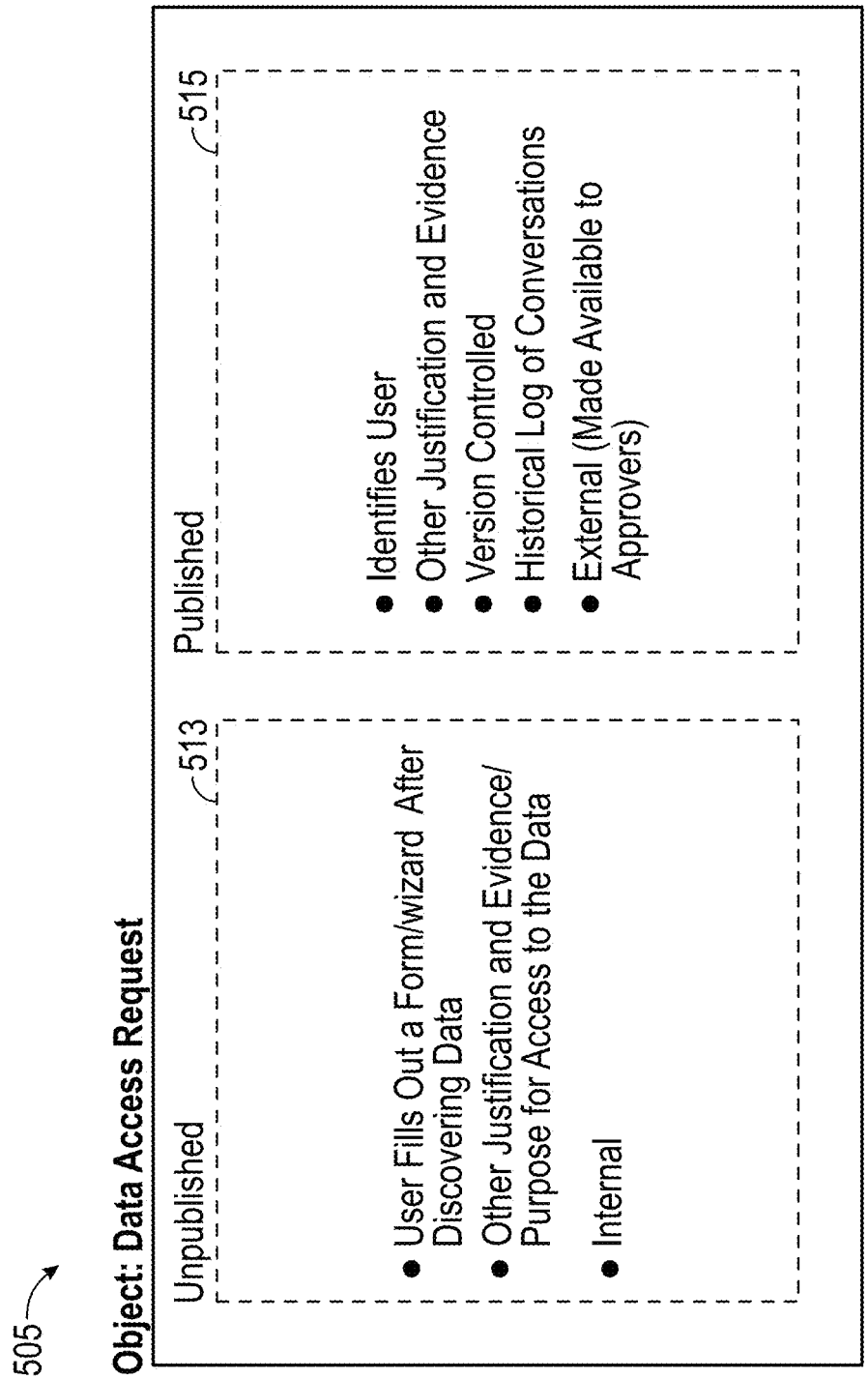

As shown in FIG. 5B, data access request object 505 may include at least two states, an unpublished state 513 and a published state 515. In an unpublished state, the data access request object may include various properties, including for example, justification or legal basis, evidence, documentation, privilege or permissions, and/or the like. Further, each instantiation of an unpublished data access request object may be associated with, and/or linked to, a data access request user that may be responsible for managing the data access request, including for example, initiating creation of the unpublished data access request object, and/or approving data access requests. In some embodiments, after the data access request user identifies a desired shared data asset, the system generates an unpublished data access request. The data access request user may fulfill an initial series of steps (e.g., fill out a form, provide justifications for access to the data, and other details) and publish a data share agreement to alter the state of the data access request object to a published state. In some embodiments, a published data access object may notify a data asset owner user that may be responsible for managing the shared data asset to review the data access requests, and/or the like. Additional details are illustrated in the example graphical user interfaces of the present disclosure.

Figure 5C:
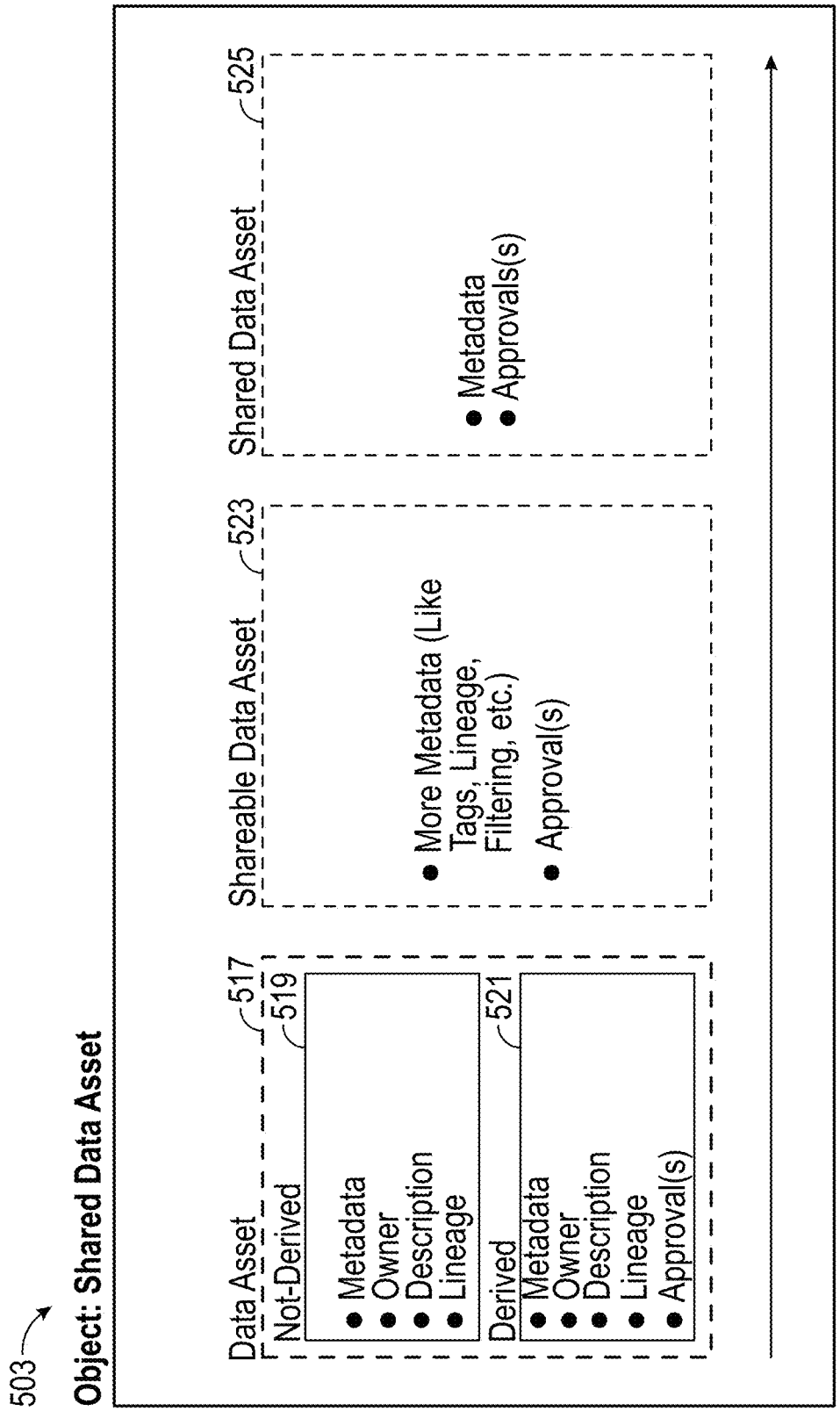

FIG. 5C shows a block diagram illustrating an example shared data asset object. The system may generate shared data asset objects 503. As mentioned above, generally, each instantiation of a shared data asset object may include various properties, including for example, schema, update frequencies, owners, tags, column descriptions, provenance/lineage, filtering, and the like. Each instantiation of a shared data asset object may be associated with, and/or linked to, a shared data asset and a data asset owner user that may be responsible for managing the shared data asset, including for example, reviewing data access requests, and/or the like.

In various embodiments, a data asset owner user begins with a data asset object 517, which may be associated with a data asset. As alluded to earlier, each data asset object may include various properties, including for example, description, tags, various metadata, various key attributes, and/or the like. In various implementations, a data asset object may be a non-derived data asset object 519 or derived data asset object 521. Generally, a non-derived data asset object is a data asset object that may not be linked to, and/or include additional information related to a derivation, provenance, and/or lineage of an associated data asset, among other information. A derived data asset object may be similar to a data asset object, but may be associated with, linked to, and/or include additional information related to a derivation, provenance, and/or lineage of the associated data asset, among other information. In various implementations, a derived data asset object may represent a derived data asset that may be based on or result from one or more source data assets and/or one or more transformations processes, among other aspects. Each instantiation of a derived data asset object may include various properties, including for example, description, various metadata, various key attributes, and/or the like. Further, each instantiation of a derived data asset object may be associated with, and/or linked to, one or more namespaces that have access to the derived data asset, and to various data access request objects. In some implementations, a derived data asset object may be a sub-type of a data asset object; in other implementations, a derived data asset object may be a separate object type from a data asset object. In various implementations, a derived data asset object may serve the same function as a data asset object and be used interchangeably with a data asset object in various workflows. In some implementations, a data access request for the derived data asset must be approved by all upstream data asset owners. In other words, the original non-derived data asset owner may approve additional downstream derived data assets. Alternatively, if the derived data asset is a combination of two or more shared data assets, approval may be required from the data asset owner users of each of the two or more shared data assets. In some implementations, the original non-derived data asset owner may sever the non-derived data asset approval requirements, meaning that additional downstream derived data assets do not require the original non-derived data asset owner's approval to be used with a data access request. Additional details related to derived data assets are provided in the '465 Publication.

In various implementations, non-derived data assets may also include information related to provenance and/or lineage. For example, if the non-derived data asset is a dataset that is a result of a union of some combination of one or more other datasets of a same data asset, the provenance and/or lineage of that dataset can be stored and tracked by the system in object metadata/information, even if the data asset is not derived.

Generally, a data asset object, derived or not derived, may change status to a shared data asset object. In various implementations, this change of status occurs when a data asset owner selects (and approves) to share the data asset. Sharing a data asset may, in some implementations, include making the status of the data asset as "shared" publicly available or available in a shared data asset library where other users may search for and select to request access to the data asset. The shared data asset object may include the various information described herein (including, for example, a list of all organizations that may have contributed data to the shared data asset), such that a user may determine whether a shared data asset includes information of interest to the user. In various implementations, a data asset object may automatically be converted to a shared data asset object when the associated data asset is shared.

For example, a data asset owner may select to share a data asset. In response, the system may convert an existing data asset object to a "shareable data asset object" 523, or may generate a new "shareable data asset object" 523. The shareable data asset object 523 may not yet be shared by the system, as one or more approvals and/or configurations may be required. For example, if the data asset is a derived data asset, one or more upstream data asset owners may need to approve the sharing of the derived data assets. Additionally, as described herein, the various filters or scoping may be applied to the data asset by the data asset owner. Once all approvals are received, the system may convert the sharable data asset object to a "shared data asset object" 525, or may generate a new "shared data asset object" 525. The shared data asset object 525 may include all the same metadata described herein, including descriptive information, and/or the like. As noted, the shared data asset object may be accessible in a shared data asset library, through which other users may request access to the shared data asset. In some implementations, the system may not covert to or generate a separate "shareable data asset object".

In general, the object model of the present disclosure provides a framework for sharing of data assets, including cross-organizational sharing of data objects. For example, and as noted above, a request to access data is represented by a data access request object. Particular data assets, as represented by respective shared data asset objects, are associated with organization namespaces via one or more data access requests, as represented by data access request objects. Particular data access request users, as represented by respective data access request user objects, are associated with the organizational namespace via one or more data access requests, as represented by data access request objects. When a data access request user is granted access to a shared data asset by a data asset owner user, the data access request user is then able to access the shared data asset. Additionally, data access request users, as represented by respective data access request user objects, are associated with data access request objects such that the data access request user may (1) generate data access request objects that, if approved by appropriate shared data asset owner users associated with the shared data asset objects (including any upstream data asset owner users in the case of a derived data asset), can associated or link shared data assets to the organizational namespace, and (2) review and approve or not approve future data access request objects. Yet further, data asset owner users, as represented by respective data asset owner objects, are associated with data asset objects such that the data asset object can review and approve or not approve data access requests.

In addition to associating or linking a data access request user object with a shared data asset object via approval of a data access request object, each given data access request can be associated with privileges/permissions/authorizations, which may include the extent to which the given data access request user may interact (e.g., read/write/modify/execute/download/export and/or the like) with the data that they are given access to in the shared data asset object. The privileges/permissions/authorizations may be determined based on an "access type", which may be provided by the data access request user and/or the data asset owner user.

A given data access request user object may be associated with or linked to multiple data access request objects and/or shared data asset objects. A given shared data asset object may be associated with or linked to multiple data access request objects and/or organizational namespaces. A given data asset owner object may be associated with or linked to multiple data access request objects and/or shared data asset objects. A given data access request object may be associated with or linked to multiple data access request objects, data asset objects, and/or data access request user objects. A given shared data asset object may be associated with or linked to multiple data access request objects. In some implementations, portions of data assets may be associated with or linked to data access request objects. As noted above, in the context of purpose-based access to data assets (e.g., as described in the '465 Publication), data access request users and data asset owner users may assign delegates or administrators to act on their behalf. Such delegates or administrators, in various implementations, may or may not be represented by objects in the system. Thus, in some implementations, multiple data access request objects may be associated with or linked to a given data access request object. Similarly, in some implementations, multiple data asset owner objects (and/or data asset owner delegate user objects) may be associated with or linked to a given shared data asset object and/or data access request object.

The various objects of the object model can store metadata associated with various aspects of the cross-organizational data sharing model, which may advantageously enable investigation and auditing. For example, each data access request object may include a legal basis or justification, proportionality information (e.g., ensuring that the scope of the data assets is proportional to the purpose for which it is requested), and/or the like, as metadata/properties of the data access request object. The system may further advantageously use the metadata to generate and/or export various reports, which may be reviewed and edited by users. For example, metadata from a data access request object may enable the generation of a report assessing the risk of the data asset access request, e.g., which can form the basis of legal documents like DPIAs and data sharing MoUs. As another example, according to various implementations, the system may use metadata from a shared data asset object and related data access request objects to generate a report informing a data asset owner what purposes the specific shared data asset is being used for. To enable the generation and/or exportation of reports, the system may provide an application programming interface ("API") for allowing a data subject to query the system as to how the data subject's data is being used. In various implementations, the API may perform a search of all shared data asset objects and, for any relevant shared data asset object found, the API may perform a search around on all relevant data access request objects. Furthermore, reports may advantageously be generated and/or exported according to any appropriate format or template, and as any appropriate filetype (e.g., as a PDF). In various implementations, the system may enable an organization to control and/or limit what data access requests are included in various types of reports.

According to various implementations, the object model of the present disclosure can provide a number of advantages associated with sharing data assets. For example, the object model can ensure that no data access request user is granted access to shared data asset except through a data access request, because data access request user objects are not directly linked to any shared data asset object. As another example, data asset owner users can modify data assets that are available in a given organizational namespace via removal of associations or links with data access request objects and/or data asset objects, and/or requesting additional data asset objects to be associated with or linked to a purpose object via data access request objects. As yet another example, data asset owner users can provide oversight regarding what organizational namespaces have access to which shared data assets, by approving or not approving data access request objects that can associate or link data assets to particular organizational namespace. As yet another example, and as mentioned above, auditing and review of various data accesses is facilitated by capturing relationships among the various objects, and the metadata/properties captured with the various objects. Further, by using the object model, various users can more easily make and propagate large scale changes to the system. For example, data assets can easily be added to or removed from a given organizational namespace, enabling rapid re-scoping of the data available for a given purpose.

VIII. Additional Example Operations of the System

Figure 6:
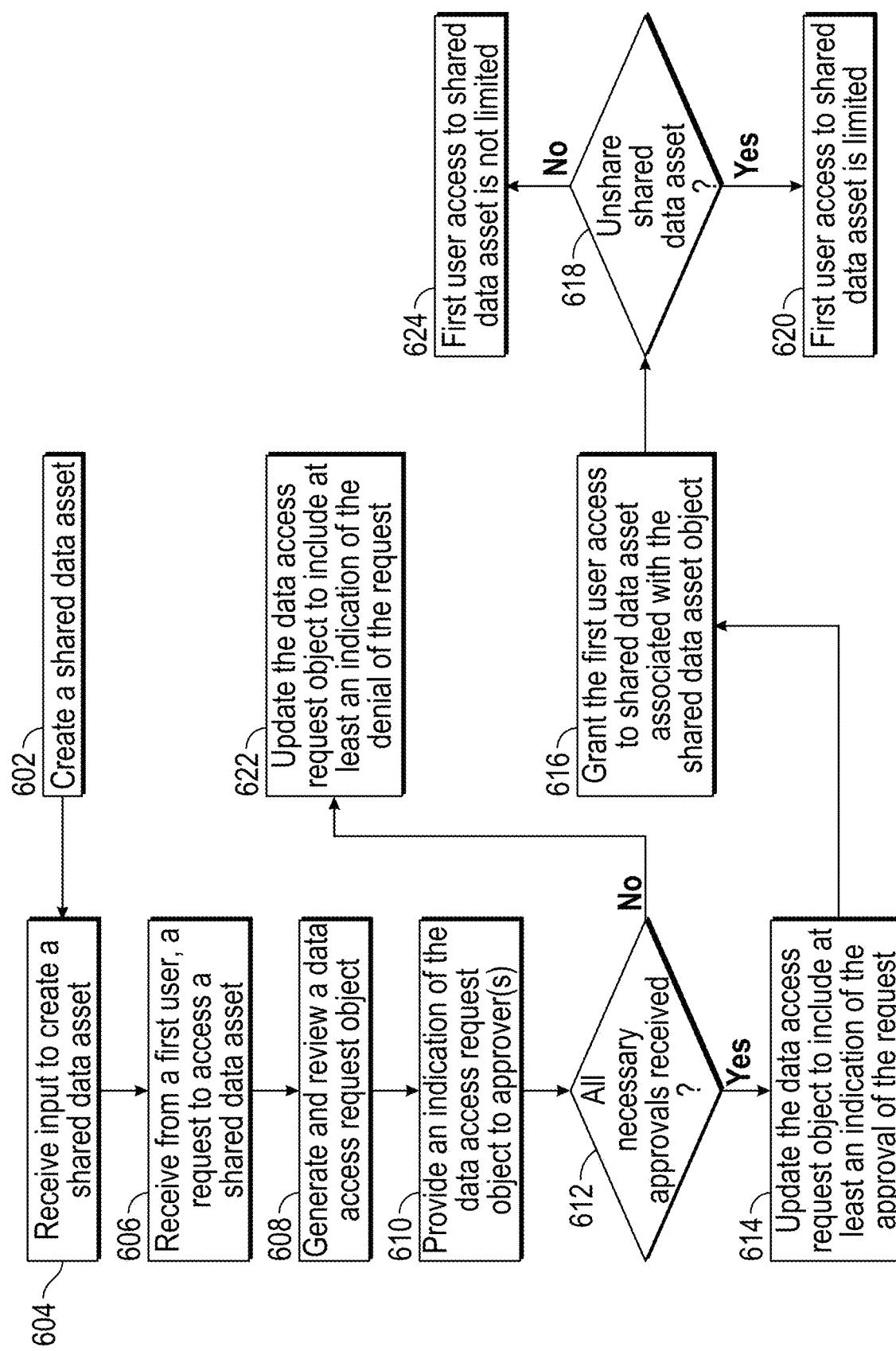
FIG. 6 shows a flowchart illustrating example operations of an access management system, according to one or more embodiments.

FIG. 6 shows a flowchart illustrating example operations of the system, according to one or more embodiments. The blocks of the flowcharts illustrate example implementations, and in various other implementations various blocks may be rearranged, optional, and/or omitted, and/or additional block may be added. The example operations of the system illustrated in FIG. 6 may be implemented, for example, by the access service 313 of the access management system 110 and/or various aspects of the data management system 150, and such operations may follow authentication of a user (such as described with reference to FIG. 4). As mentioned above, in various implementations, an operating system, file management system, and/or other service (e.g., authentication service 311 and/or aspects of the data management system 150) can manage authentication and authorizations/permissions/privileges of a user.

At block 602 the system creates a shared data asset at the request of a data asset owner user. Creation of a shared data asset, as described above and below, may include, for example, obtaining necessary approvals, defining data minimization, filtering, and/or scoping, and/or the like. At block 604, the system receives an input, from the data asset owner user, to create a shared data asset (e.g., as later represented by a shared data asset object). As mentioned above, the shared data asset object may be associated with, and/or linked to, a data asset owner user that may be responsible for managing the shared data asset, including for example, reviewing data access requests, and/or the like. At block 606, the system receives, from a data access request user, a request to access a shared data asset. At block 608, in response to receiving the request to access a shared data asset, the system generates a data access request object. As described herein, in some implementations, the system may generate a data access request object in an unpublished state. The associated data access request user may fulfill a series of steps and publish a data share agreement to alter the state of the data access request object to a published state. In the unpublished state, the data access request object may be accessible by users that are working together to determine the bounds of the data access request, including data assets to be requested, and the like. In the published state, the data access request object may be accessible by, for example, data asset owners/approvers that can review and approve access to the shared data assets being requested. In some embodiments, the data access request object may be versioned. There may be versions associated to changes that are made to the data access request object. Additionally, the version of the data access request object may change as the state of the data access request object changes from unpublished to published. At block 610, further in response to receiving the request to access a shared data asset, and when generating a data access request object, the system provides an indication of the data access request object to approver(s). In various embodiments, the approver(s) may be the shared data asset owner users. At block 612, the one or more data asset owner users may then review the request, and either approve or deny the request. If the request is denied, at block 622 that system updates the data access request object to include at least an indication of the denial of the request. If the request is approved, at block 614 the system updates the data access request object to include at least an indication of the approval of the request. Further, at block 616 the system grants the data access request user access to the shared data asset associated with the shared data asset object. As described above, granting access to a shared data asset may include updating namespace markings associated with the shared data asset. In various embodiments, at block 618 a data asset owner user may unshare a shared data asset object. Unsharing a shared data asset object may include a range of situations including completely restricting access to a shared data asset to modifying and limiting aspects of the shared data asset object. If the data asset object is unshared, at block 620 the data access request user's access to the shared data asset object may be limited. If the data asset owner user does not unshare the shared data asset, at block 624 the data access request user's access to the shared data asset remains unchanged.

In various implementations, data assets may be updated periodically, intermittently, on demand, and/or the like. For example, additional data may be added to the data asset, or changes may be made to the data asset. If the data asset is a shared data asset, such updates are propagated to the shared data asset, such that other users of the shared data asset receive the updates. In various implementations, when a shared data asset is unshared, access to the data asset may be entirely revoked. Alternatively, when a shared data asset is unshared, receipt of any updates to the data asset may be denied. The effect of unsharing a shared data asset may be determined by the system, by a data asset owner, and/or based on a configuration of a shared data asset object.

In various implementations, the system may perform additional operations including: receiving an input from the data access request user requesting to view a graph-based visualization of objects associated with the shared data asset object, and in response to receiving the input, generating a graph-based visualization of objects associated with the shared data asset object. The graph-based visualization of objects may include graphical nodes indicative of objects and graphical connectors indicative of links between the objects, wherein the objects associated with the shared data asset object include: any tags associated with the shared data asset, any derived data assets associated with the shared data asset, and any data access requests associated with the shared data asset. In an example, in the graph-based visualization of objects the data access request object may be linked to the shared data asset object. In another example, the graph-based visualization of objects illustrates the presence of any derived shared data assets, as an original shared data asset object and all downstream derived data assets may be visualized.

In various implementations, the system may require that that the data access request user to provide a justification with the request to access data assets associated with the shared data asset object, and the justification may be included in the data access request object as metadata. The data access request object may further be associated with an access type provided by the data access request user, and the access type may affect permissions of the data access request user with respect to the data assets associated with the shared data access object.

In various implementations, the system may perform data minimization operations (e.g., filter) a shared data asset according to a one or more filtering or scoping rules based on associating the data asset object with a data access request object. Further, the system may allow the data asset owner user to filter or scope a data asset before associating the data asset object with a data access request object. In various implementations, the filtered data asset may constitute a derived data asset. Filtering may be applied on rows, columns, and/or the like. Filtering may include scoping on any aspect of the shared data asset object. Scoping includes, for example, limiting a shared data asset object to a particular geographic area. The scope may be dynamically determined by the system based on a property associated with a data access request object. For example, a data access request from a "west" region may cause the system to automatically scope a shared data asset to a portion of the dataset associated with the west region, while a data access request from a "south" region may cause the system to automatically scope a shared data asset to a portion of the dataset associated with the south region. Other types of automatic scoping are provided by the system. Such filtering and scoping may be automatic and may be based on a "scope" and/or various other filtering rules associated with the data asset, the purpose, and/or the like (and as further described herein). In the case of updates to shared data assets, filtering may be automatically applied before any updates are shared.

In various implementations, data access requests may include a duration limit, and when the duration limit expires the system may no longer provide updates and/or access to a requestor. In various implementations, a requestor and/or a data owner may be able to extend the duration of a data access request before expiry.

IX. Example Interactive Graphical User Interfaces

FIGS. 7, 8A-8C, and 9A-9F illustrate example interactive graphical user interfaces of the system, according to various embodiments. The examples user interfaces are provided for illustrative purposes to show various functionalities of the system. In other implementations, the interactive graphical user interfaces may include more or fewer elements, may be arranged differently, and/or may be combined or divided. As mentioned above, the various example interactive graphical user interfaces may be generated/provided by the access service 313 of the access management system 110, and/or another service or module of the system.

Figure 7:
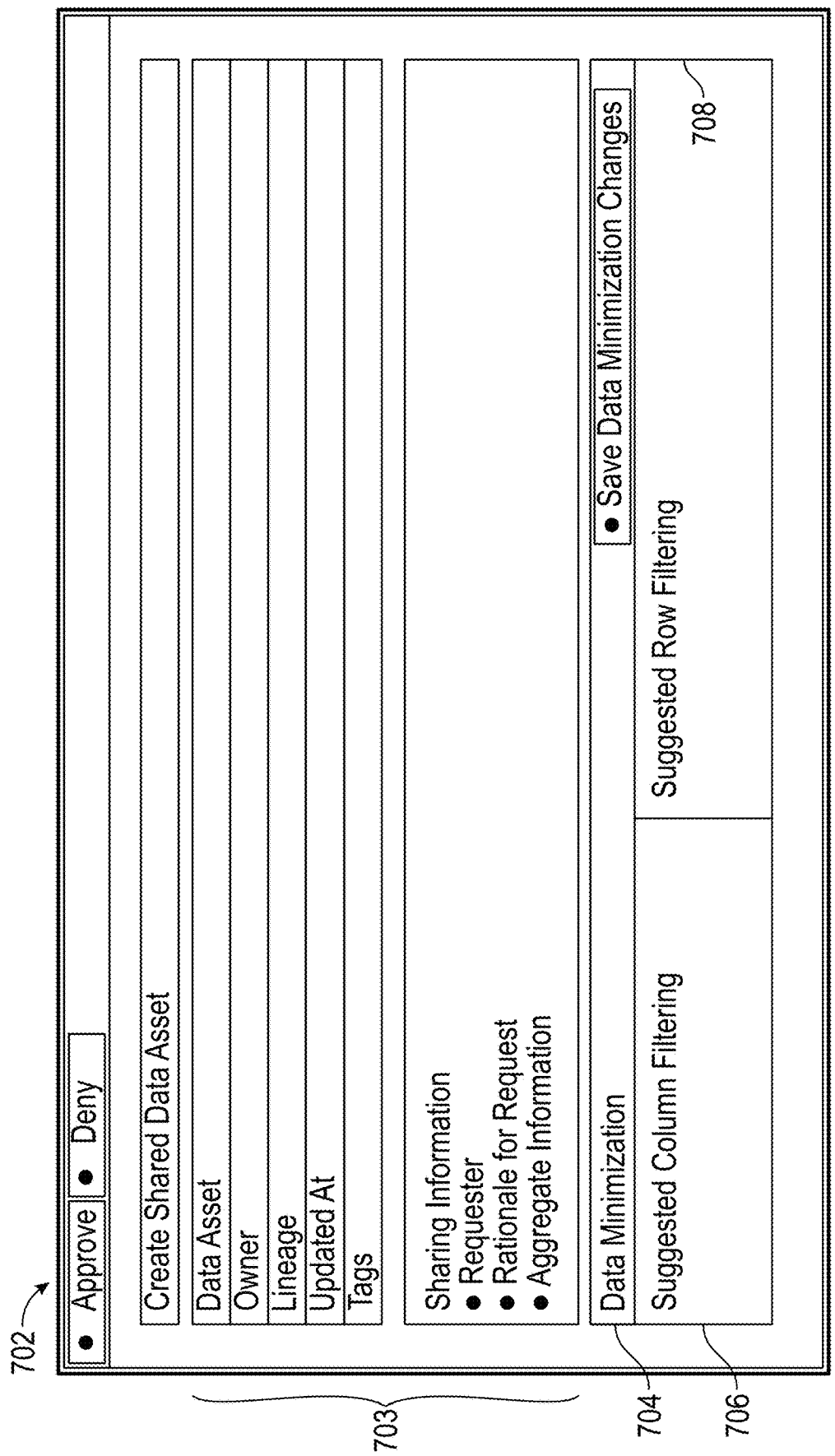
FIG. 7 illustrates an example interactive graphical user interface related to a data asset owner user, among others, according to one or more embodiments.

FIG. 7 illustrates an example interactive graphical user interface 702 related to a data asset owner user, among other users, according to one or more embodiments. In this example, the user interface enables the data asset owner user to create a shared data asset object. Details related to the data asset to be shared are displayed in the user interface 702 in response to the data asset owner's selection. The details (which may be found from the metadata of the related shared data asset object) may include, in a top portion 703 of the user interface, a title, the data asset to be shared, the data owner sharing the data asset, a derivation or lineage associated with the data asset (in the case that the data asset is a derived data asset), a status of the request, a justification for sharing the data asset, indications of any data asset owners that must approve the sharing (e.g., the current data asset owner and any upstream owners in the case of a derived data asset), and/or the like. The bottom portion 704 of the user interface includes data minimization or filtering details, including any scoping of the data asset. For example, portion 704 includes a listing of columns 706 of the data asset that may be filtered when the data asset is shared. In an implementation, the data asset owner user may select one or more columns by selecting the checkbox next to each column. If the data asset is shared, any unselected columns may be filtered from the data asset. In some embodiments, some columns may be pre-selected according to a default data minimization or filtering rule, such as a scope (e.g., a geographic scope associated with the data access request). Furthermore, user interface portion 704 includes further row-based filtering options 708. The data asset owner user may edit options 708 to apply data minimization or filtering to the rows of the data asset. As with the column-based data minimization or filtering, the row-based data minimization or filtering may be pre-selected according to a default data minimization or filtering rule, such as a scope (e.g., a geographic scope associated with the data access request). Other types of data minimization or filtering may similarly be applied to data assets associated with the shared data asset, purposes, and/or the like. If the data asset is shared, any unselected rows may be filtered from the data asset. Using buttons in the top portion, the data asset owner user may save changes made to the filtering of rows and columns.

Advantageously, the data asset owner user may review other data assets associated with the shared data asset, and may thereby evaluate the effect of joining the current data asset with the existing data assets, e.g., for sharing and/or in the purpose. For example, the data asset owner user may determine that joining the current data asset with the existing data assets may have the effect of de-anonymizing pseudo-anonymized data in one of data assets. Thus, the data asset owner user may decide not to combine or share a data asset.

Figure 8B:
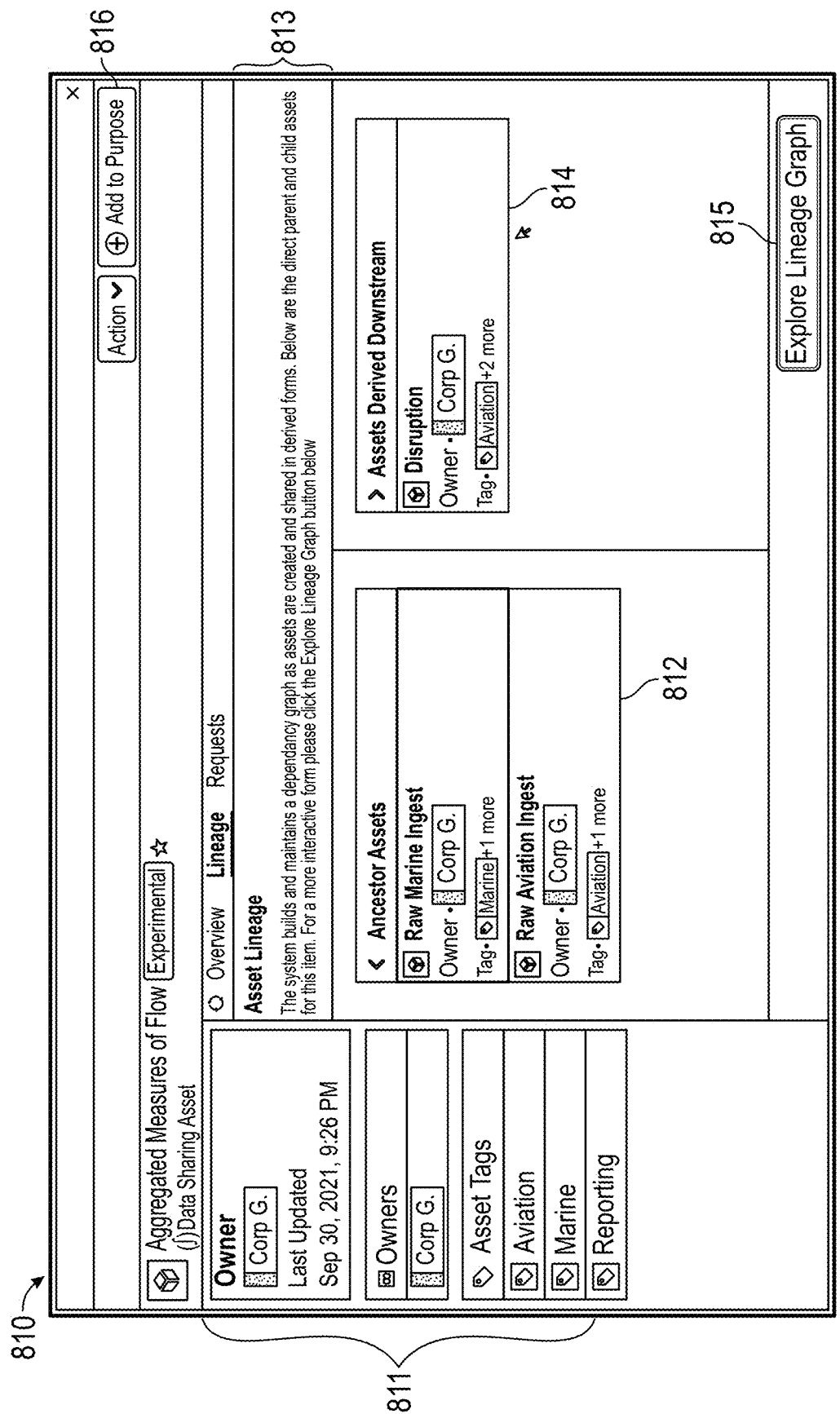
Figure 8C:
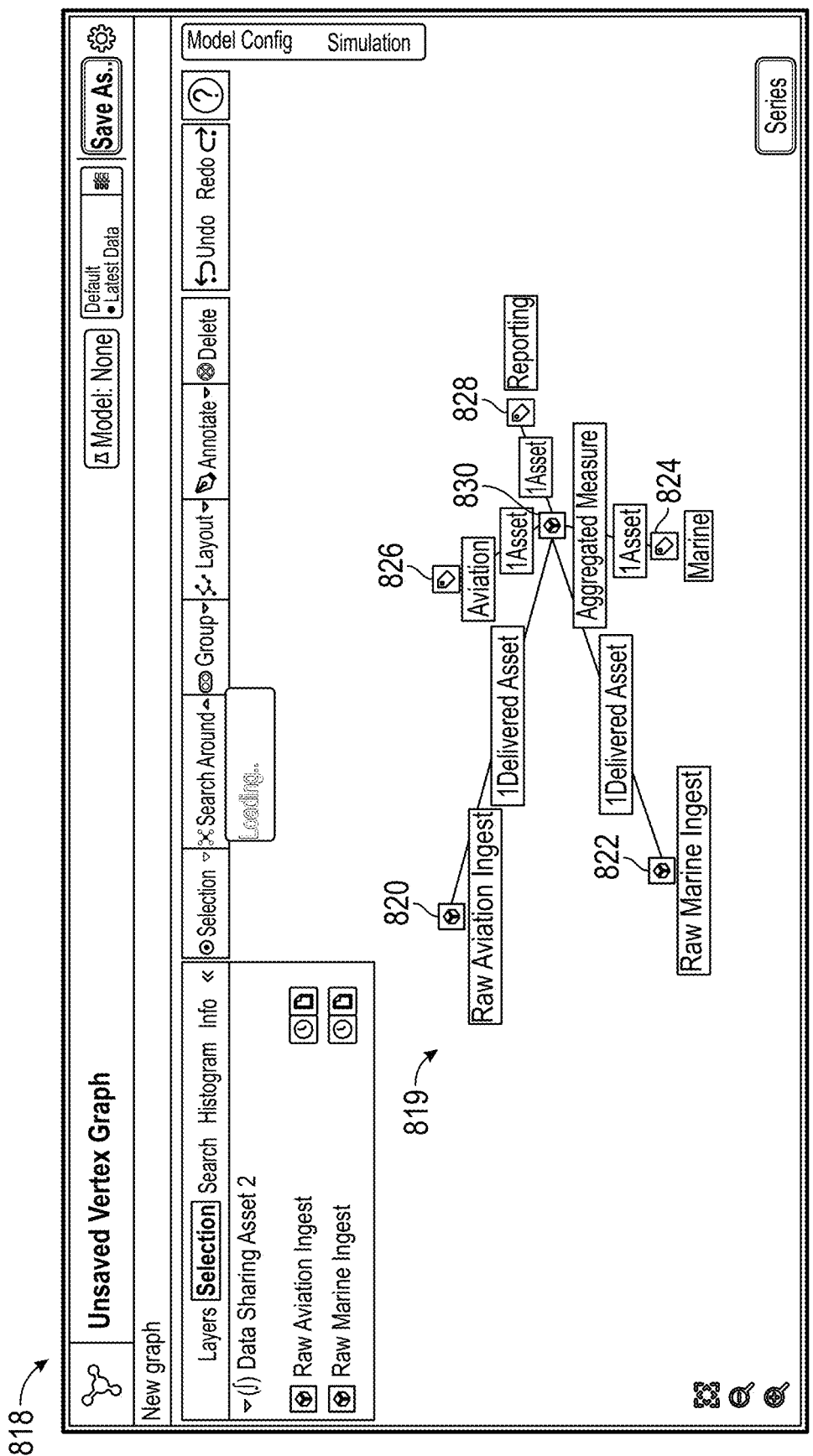

FIGS. 8A-8C illustrate example interactive graphical user interfaces related to a data access request user and/or data asset owner user, among others, when discovering and exploring available shared data asset objects, and requesting access to shared data assets, according to one or more embodiments. Referring to FIG. 8A, a user interface 802 includes a listing of shared data assets 806. User interface 802 may comprise a shared data asset library. The user interface shows, for each of the listed shared data assets (e.g., shared data asset 808), various metadata details (e.g., as may be included in properties of the associated shared data assets) including title, description, tags, and the shared data asset owner associated to the shared data asset. Via the user interface 802, the data access request user may search for and/or filter the various shared data asset objects via filter/search tools in shared data asset library 804. The listed shared data asset objects 806 may include other information regarding data access request users who have been approved. In an implementation the system may indicate statuses of any data access requests submitted by the data asset owner user for any of the listed shared data assets.

Referring to FIG. 8B, a user interface 810 follows the user interface 802. In user interface 810, the data access request user has selected one of the listed shared data assets 808. Details related to the selected shared data asset are then displayed in the user interface 810 in response to the data access request user's selection. The details (which may be found from the metadata of the related shared data asset object) include, in section 811, the title of the shared data asset as well as the corresponding data asset owner user and tags, in the top portion of the user interface, in section 813, a detailed description of the shared data asset and other details, and in section 812, any shared data assets, derived or not derived, associated with or linked to the shared data asset. In section 814, any derived downstream shared data assets associated with or linked to the shared data asset is represented. In the example user interface 810, three other shared data assets are shown as linked to the shared data asset. Using the "explore lineage graph" button 815, the data access request user may select to review details related to the shared data asset in a graph-based visualization view, in additional detail. Using button 816, the data access request user may request access to the shared data asset (e.g., causing the system to generate a data access request). In other words, using button 816, the data access request user causes the system to initiate a request of shared data asset.

Referring to FIG. 8C, a user interface 818 follows the user interface in 810 and is shown in response to the data access request user selecting the "explore lineage graph" button 815 from user interface 810. As shown in user interface 818, a graph-based visualization 819 includes visual indications (e.g., graphical nodes or icons) of the various linked objects, with links represented by graphical connectors. In some embodiments, the graph-based visualization may be viewed by data asset owner users as well. The data access request user may select any of the objects in the graph view to view details (e.g., properties) associated with the selected shared data asset object. The data access request user may also interact with the graph view and the displayed objects via moving, scrolling, zooming, and/or the like. As shown in the example visualization 819, the shared data asset object 830 is derived from two shared data asset objects 820 and 822. Additionally, the shared data asset object 830 contains three tags, nodes 824, 826, and 828. Via the graph-based visualization 819, a data access request user and/or a data asset owner user can investigate linked objects to help decide whether or not to approve or deny various requests. Additionally, such user interfaces can enable a user to quickly determine all shared data assets and data access request objects that have access to a certain shared data asset, and all users that have access to those purposes. Such user interfaces can further indicate all requests associated with those data access requests, assets, and users, and the user interface can color code those requests to indicate whether such requests were approved or denied, for example.

Figure 9C:
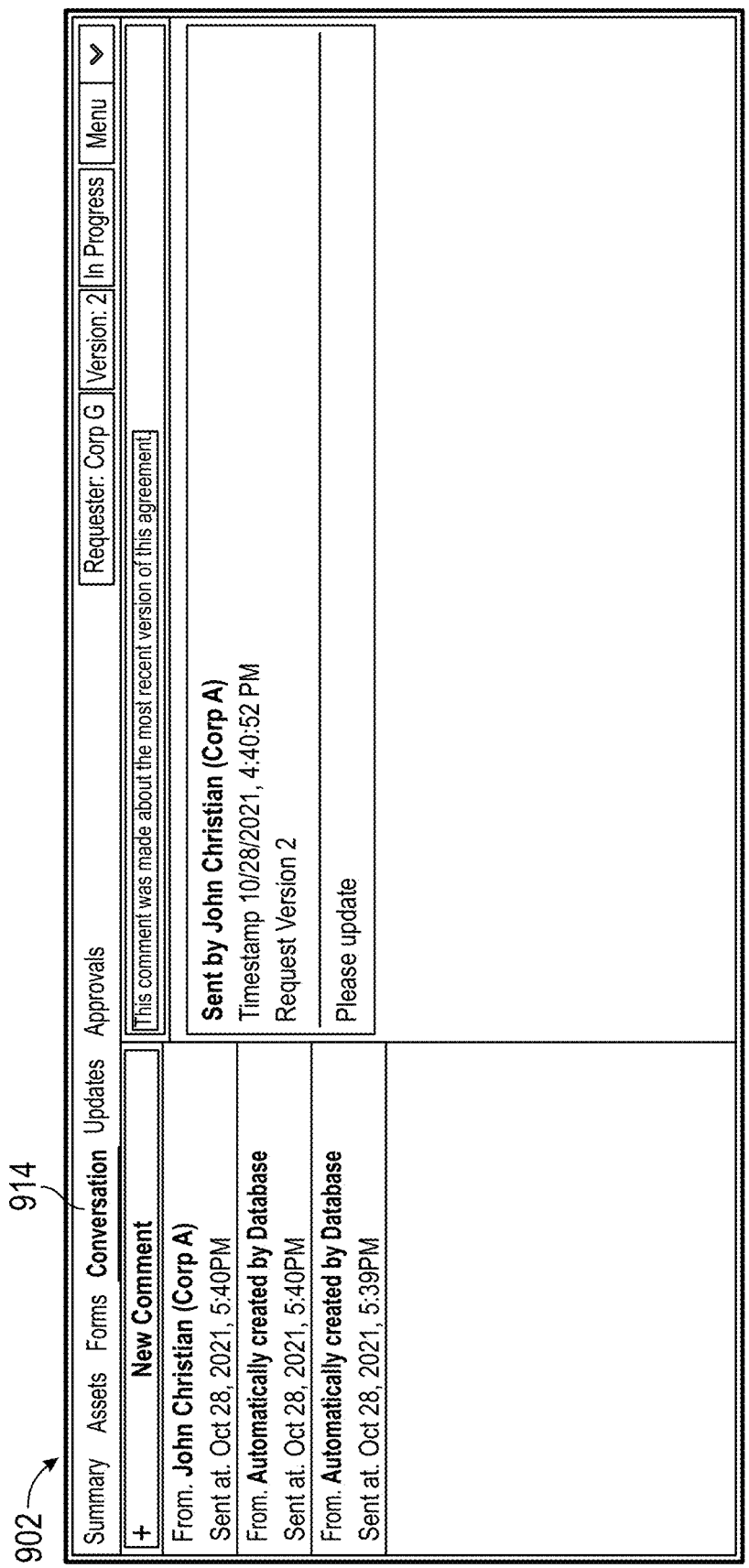

FIGS. 9A-9F illustrate example interactive graphical user interfaces related to a data access request user, among other users, according to one or more embodiments. Referring to FIG. 9A, a user interface 902 may follow user interface 810 and may be shown in response to the data access request user selecting button 816 to request access to a shared data asset. User interface 902 includes tabs (e.g., summary, assets, forms, conversation, updates, and approvals) in the request workflow for a data access request object. User interface 902 may be referred to as the data access request module. The user interface includes a navigation bar 908 including the different tabs in the data access request object. Additionally, the user interface includes a publishable state 906. As shown in user interface 902, the data access request object is currently in an "in-progress" state, which may comprise an "unpublished" state. As mentioned above, the data access request object may be publishable, therefore, when the data access request object is published, the state of the data access request object may change from "in-progress" to "live" or the like. As shown in user interface 902, the "summary" tab is active. The summary tab may include portion 904 detailing a summary of the overall data access request. Additionally, the user interface shows, for each of the listed shared data assets that are included in the request, various metadata details (e.g., as may be included in properties of the associated shared data asset objects) including title, description, owner, permissions, and/or the like.

Referring to FIG. 9B, navigation tab "forms" 910 of user interface 902 has been selected. In user interface 902 under navigation tab 910, the user interface enables the data access request user, via form 912, to edit and answer questions pertaining to justifications of a data access request object, including specifying the shared data asset, the justifications, and potential legal basis. In various implementations, and as mentioned above, justifications may be required of data access request users when creating various kinds of requests, such that a history of data access and associated reasons may be audited. In some implementations, updates to the form of the data access request object may be associate to different versions of the data access request object. As mentioned above, there may be versions associated to changes that are made to the data access request object, such as changes to the data assets requested, a scope of the data access request, comments associated with the data access request, and the like.

Referring to FIG. 9C, navigation tab "conversation" 914 of user interface 902 has been selected. In user interface 902 under navigation tab 914, the user interface enables one or more data access request users the ability to have inter- and cross-organizational conversations with other users regarding the data access requests. A historical log of conversations pertaining to the associated data access request object may be visible for easy review.

Figure 9D:
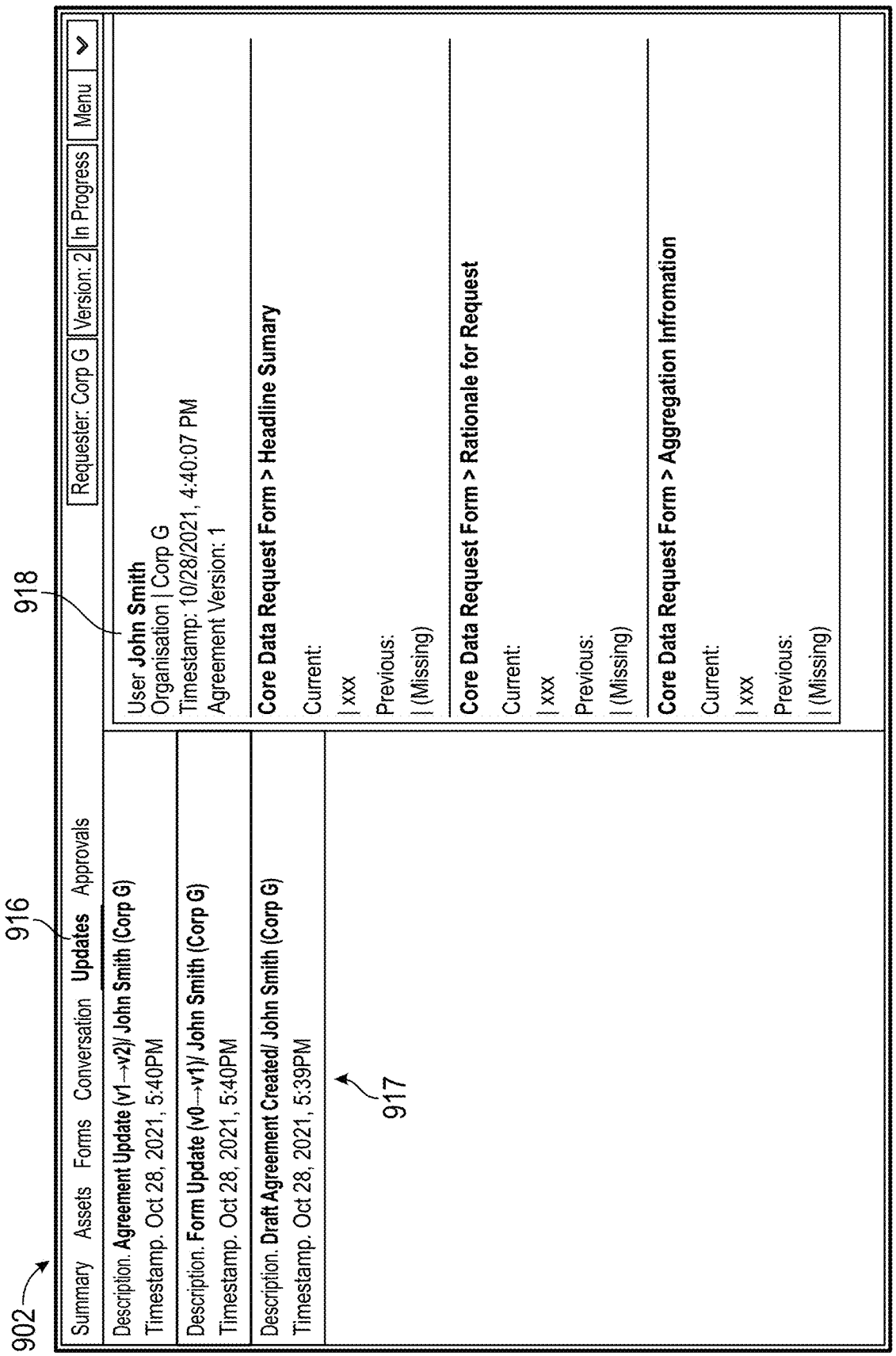

Referring to FIG. 9D, navigation tab "updates" 916 of user interface 902 has been selected. In user interface 902 under navigation tab 916, the user interface enables the data access request user to track the versions of the data access request object and updates to the request as it is modified by various users. For example, in section 917, the data access request user may view the list of different versions of the data access request object and may scroll through the list or filter the list. In this example, the version of the data access request object has been updated twice: first when the form was updated, and then when the data share agreement was updated. Any changes and updates made to the data access request object may be compiled and viewed in this user interface, e.g., as listed in column 918.

Referring to FIG. 9E, navigation tab "approvals" 920 of user interface 902 has been selected. In user interface 902 under navigation tab 920, the user interface enables the data access request user to view the status of approvals in regards to the desired shared data asset object. In some embodiments, when the desired shared data asset object is a derived data asset, or when the data access request object involved multiple shared data assets, there may be one or more approvers associated with one or more data asset owner users. The user interface may allow a data access request user to keep track of approvals which include pending approvers 922, stale responses 924, and valid responses 926. Pending approvers 922 may be data asset owner users which are associated to and/or linked with the shared data asset but have not approved the request yet. Stale responses 924 may include previously approved data access request objects by data asset owner users that need to be re-approved as a result of some changes to the data access request objects and/or shared data asset objects. Valid responses 926 may include approvals that have been granted to the data access request objects by the associated data asset owner users. In some implementations, when all or part of a data access request object for a shared data asset object changes after necessary approvals have been given (by the corresponding data asset owner users), all valid responses 926 may revert to stale responses 924, which would require the associated data asset owner user to approve the data access request object again. Upon all necessary approvals, the system may deliver the shared data asset object directly to the data access request user's organizational namespace.

Referring to FIG. 9F, user interface 928 follows the user interface 902 and in response to the data access request user "publishing" the data access request object. As mentioned above, a data access request object may be publishable. Generally, in an unpublished or "in progress" state, the data access request object may only be visible to relevant parties working on the data access request. As shown in in user interface 928, the user interface enables the data access request user to make the data access request object visible to the data asset object owner by changing the status of the data access request object from "in progress" to "live," "published," or the like. As alluded to earlier, in some implementations, once the data share agreement is published, the data asset object owner may be notified of the data access request object, at which point the data asset object owner may approve or deny access to the respective shared data asset.

X. Additional Implementation Details and Embodiments

In an implementation the system (e.g., one or more aspects of the access management system 110, the data management system 150, other aspects of the computing environment 111, and/or the like) may comprise, or be implemented in, a "virtual computing environment". As used herein, the term "virtual computing environment" should be construed broadly to include, for example, computer-readable program instructions executed by one or more processors (e.g., as described in the example of FIG. 10) to implement one or more aspects of the modules and/or functionality described herein. Further, in this implementation, one or more services/modules/engines/and/or the like of the system may be understood as comprising one or more rules engines of the virtual computing environment that, in response to inputs received by the virtual computing environment, execute rules and/or other program instructions to modify operation of the virtual computing environment. For example, a request received from the user computing device 301 may be understood as modifying operation of the virtual computing environment to cause the request access to a resource from the system. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the system. Initial operation of the virtual computing environment may be understood as an establishment of the virtual computing environment. In some implementations the virtual computing environment may comprise one or more virtual machines, containers, and/or other types of emulations of computing systems or environments. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the system as a virtual computing environment may advantageously enable executing different aspects or modules of the system on different computing devices or processors, which may increase the scalability of the system. Implementing one or more aspects of the system as a virtual computing environment may further advantageously enable sandboxing various aspects, data, or services/modules of the system from one another, which may increase security of the system by preventing, e.g., malicious intrusion into the system from spreading. Implementing one or more aspects of the system as a virtual computing environment may further advantageously enable parallel execution of various aspects or modules of the system, which may increase the scalability of the system. Implementing one or more aspects of the system as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Various embodiments of the present disclosure may be a system, a method, and/or a computer program product at any possible technical detail level of integration. The computer program product may include a computer-readable storage medium (or mediums) having computer-readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer-readable storage medium (or mediums). Computer-readable storage mediums may also be referred to herein as computer-readable storage or computer-readable storage devices.

The computer-readable storage medium can be a tangible device that can retain and store data and/or instructions for use by an instruction execution device. The computer-readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer-readable program instructions may be callable from other instructions or from itself, and/or may be invoked in response to detected events or interrupts. Computer-readable program instructions configured for execution on computing devices may be provided on a computer-readable storage medium, and/or as a digital download (and may be originally stored in a compressed or installable format that requires installation, decompression, or decryption prior to execution) that may then be stored on a computer-readable storage medium. Such computer-readable program instructions may be stored, partially or fully, on a memory device (e.g., a computer-readable storage medium) of the executing computing device, for execution by the computing device. The computer-readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart(s) and/or block diagram(s) block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid-state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid-state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a service, module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, and/or the like with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows 11, Windows Server, and/or the like), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 10:
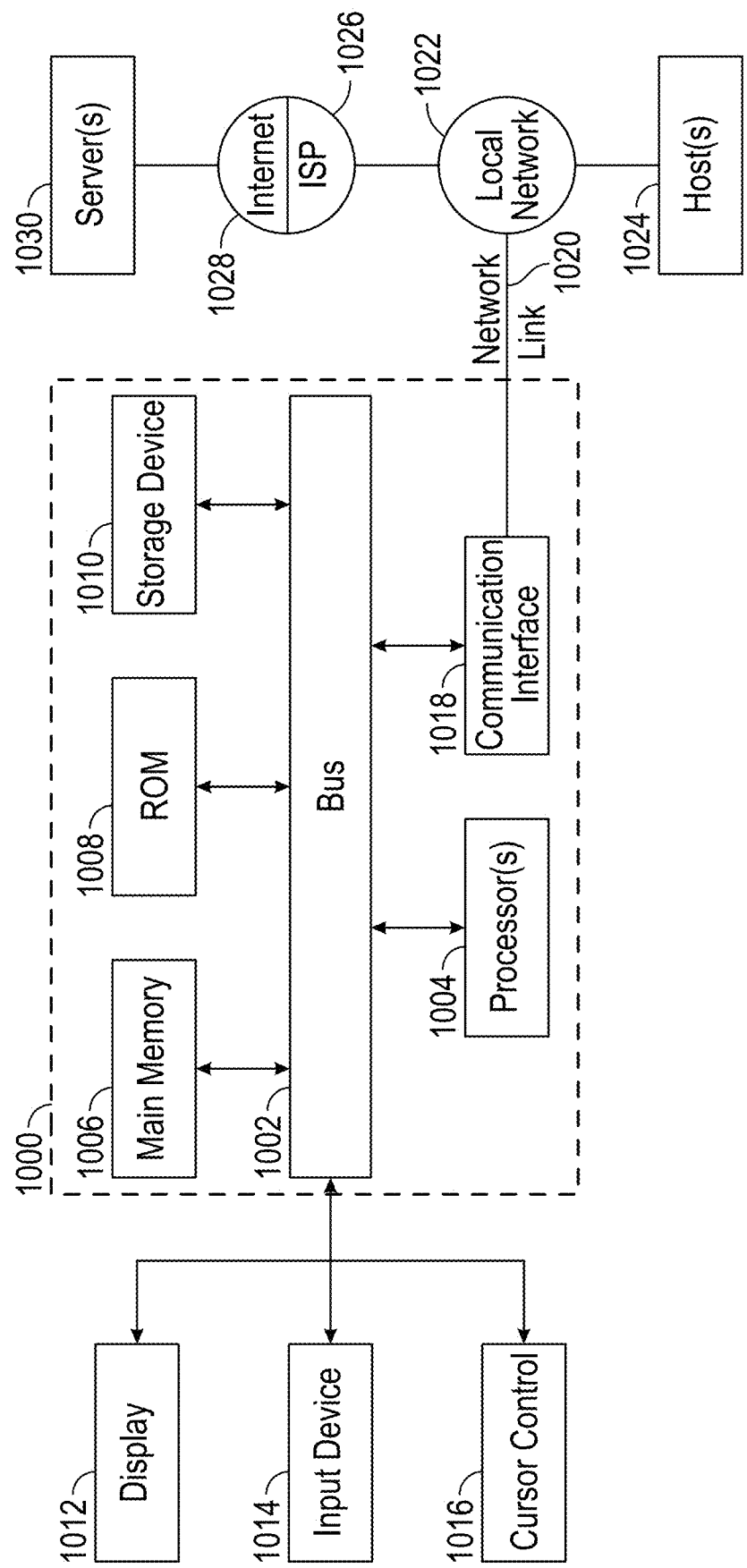
FIG. 10 shows a block diagram illustrating a computer system upon which various embodiments may be implemented.

For example, FIG. 10 shows a block diagram that illustrates a computer system 1000 upon which various embodiments and/or aspects (e.g., one or more aspects of the access management system 110, the data management system 150, other aspects of the computing environment 111, and/or the like) may be implemented. Computer system 1000 includes a bus 1002 or other communication mechanism for communicating information, and a hardware processor, or multiple processors, 1004 coupled with bus 1002 for processing information. Hardware processor(s) 1004 may be, for example, one or more general purpose microprocessors.

Computer system 1000 also includes a main memory 1006, such as a random-access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), and/or the like, is provided and coupled to bus 1002 for storing information and instructions.

Computer system 1000 may be coupled via bus 1002 to a display 1012, such as a cathode ray tube (CRT) or LCD display (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1000 may include a user interface module to implement a GUI that may be stored in a mass storage device as computer executable program instructions that are executed by the computing device(s). Computer system 1000 may further, as described below, implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more computer-readable program instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

Various forms of computer-readable storage media may be involved in carrying one or more sequences of one or more computer-readable program instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN (or WAN component to communicated with a WAN). Wireless links may also be implemented. In any such implementation, communication interface 1018 sends and receives electrical, electromagnetic, or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic, or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, and/or the like may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general-purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

XI. Example Clauses

Examples of the implementations of the present disclosure can be described in view of the following example clauses. The features recited in the below example implementations can be combined with additional features disclosed herein. Furthermore, additional inventive combinations of features are disclosed herein, which are not specifically recited in the below example implementations, and which do not include the same features as the specific implementations below. For sake of brevity, the below example implementations do not identify every inventive aspect of this disclosure. The below example implementations are not intended to identify key features or essential features of any subject matter described herein. Any of the example clauses below, or any features of the example clauses, can be combined with any one or more other example clauses, or features of the example clauses or other features of the present disclosure.

Clause 1: A computer-implemented method for providing sharing of electronic data assets, the computer-implemented method comprising, by one or more hardware processors executing program instructions: receiving, from a first user, a request to access a shared data asset, wherein: the shared data asset is associated with a shared data asset object, and the shared data asset object identifies at least a second user authorized to approve sharing of the shared data asset; in response to receiving the request from the first user: generating a data access request object including at least an identification of the first user and an identification of the shared data asset object; and providing an indication of the data access request object to the second user associated with the shared data asset object; receiving, from the second user, an approval of the request; and in response to receiving the approval of the request from the second user: granting the first user access to the shared data asset associated with the shared data asset object.

Clause 2: The computer-implemented method of Clause 1 further comprising, by the one or more hardware processors executing program instructions: receiving, from the second user, a second request to access a second shared data asset, wherein: the second shared data asset is associated with a second shared data asset object, and the second shared data asset object identifies at least the second user and a third user authorized to approve sharing of the second shared data asset; in response to receiving the second request from the second user: generating a second data access request object including at least an identification of the second user and an identification of the second shared data asset object; and providing an indication of the second data access request object to the third user associated with the second data asset object; receiving, from the third user, an approval of the second request; and in response to receiving the approval of the second request from the third user: updating the second data access request object to include at least an indication of the approval of the second request; and granting the second user access to the second shared data asset associated with the second shared data access object.

Clause 3: The computer-implemented method of any of Clauses 1-2 further comprising, by the one or more hardware processors executing program instructions: further in response to receiving the approval of the request from the second user: updating the data access request object to include at least an indication of the approval of the request.

Clause 4: The computer-implemented method of any of Clauses 1-3, wherein the shared data asset is a derived data asset comprising a combination of at least two shared data assets, and wherein the shared data asset object identifies the shared data asset as derived.

Clause 5: The computer-implemented method of any of Clauses 1-4, wherein the shared data asset object comprises metadata including at least one of: schema, update frequencies, owner, tag, approver, column identifier, column description, derivation, or filtering.

Clause 6: The computer-implemented method of any of Clauses 1-5, wherein the data access request object comprises metadata including at least one of: forms, conversations, updates, approvals, re-approvals, statuses, or versions.

Clause 7: The computer-implemented method of any of Clauses 1-6 further comprising, by the one or more hardware processors executing program instructions: receiving, from the second user, a second request to stop sharing the shared data asset with the first user; and in response to receiving the second request from the second user, limiting access to the shared data asset.

Clause 8: The computer-implemented method of any of Clauses 1-7, wherein the shared data asset is included in a shared data asset library.

Clause 9: The computer-implemented method of any of Clauses 1-8 further comprising, by the one or more hardware processors executing program instructions: receiving one or more user inputs to share a data asset; and in response to receiving the one or more user inputs, generating the shared data asset object, wherein the shared data asset is based on the data asset.

Clause 10: The computer-implemented method of Clause 9, wherein the shared data asset is scoped or filtered from the data asset, and wherein the shared data asset object includes information on the scoping or filtering of the data asset.

Clause 11: The computer-implemented method of any of Clauses 1-10 further comprising, by the one or more hardware processors executing program instructions: requesting, from the first user, a justification with the request to access a shared data asset; and updating the data access request object with the justification.

Clause 12: The computer-implemented method of any of Clauses 1-11, wherein the shared data asset is updated, and wherein the updates are propagated.

Clause 13: The computer-implemented method of any of Clauses 1-12, wherein the data access request object is versioned.

Clause 14: The computer-implemented method of any of Clauses 1-13, wherein the data access request object is publishable.

Clause 15: The computer-implemented method of any of Clauses 1-14, wherein the shared data asset is associated with at least one namespace or workspace, and wherein granting the first user access to the shared data asset includes updating a namespace or workspace associated with the shared data asset.

Clause 16: The computer-implemented method of any of Clauses 1-15 further comprising, by the one or more hardware processors executing program instructions: receiving an input from the first user requesting to view a graph-based visualization of objects associated with the shared data asset object; and in response to receiving the input: generating a graph-based visualization of objects associated with the shared data asset object, the graph-based visualization including graphical nodes indicative of objects and graphical connectors indicative of links between the objects, wherein the objects associated with the shared data asset object include: any tags associated with the shared data asset, any derived data assets associated with the shared data asset, and any data access requests associated with the shared data asset.

Clause 17: A system comprising: a computer readable storage medium having program instructions embodied therewith; and one or more processors configured to execute the program instructions to cause the system to perform the computer-implemented method of any of Clauses 1-16.

Clause 18: A computer program product comprising a computer-readable storage medium having program instructions embodied therewith, the program instructions executable by one or more processors to cause the one or more processors to perform the computer-implemented method of any of Clauses 1-17.

What is claimed is:

1. A computer-implemented method for providing sharing of electronic data assets, the computer-implemented method comprising, by one or more hardware processors executing program instructions:
   receiving, from one or more users, approval to share a data asset;
   in response to receiving approval to share the data asset, generating a shared data asset object associated with the shared data asset;
   receiving, from a first user, a request to access the shared data asset, wherein:
      the first user is different from the one or more users, and
      the shared data asset object identifies at least a second user authorized to approve access to the shared data asset;
   in response to receiving the request from the first user:
      generating a data access request object including at least an identification of the first user and an identification of the shared data asset object; and
      providing an indication of the data access request object to the second user associated with the shared data asset object;
   receiving, from the second user, an approval of the request to access the shared data asset; and
   in response to receiving the approval of the request from the second user:
      granting the first user access to the shared data asset associated with the shared data asset object.

2. The computer-implemented method of claim 1 further comprising, by the one or more hardware processors executing program instructions:
   receiving, from the second user, a second request to access a second shared data asset, wherein:
      the second shared data asset is associated with a second shared data asset object, and
      the second shared data asset object identifies at least the second user and a third user authorized to approve sharing of the second shared data asset;
   in response to receiving the second request from the second user:
      generating a second data access request object including at least an identification of the second user and an identification of the second shared data asset object; and
      providing an indication of the second data access request object to the third user associated with the second shared data asset object;
   receiving, from the third user, an approval of the second request; and in response to receiving the approval of the second request from the third user:
  updating the second data access request object to include at least an indication of the approval of the second request; and
  granting the second user access to the second shared data asset associated with the second shared data asset object.

3. The computer-implemented method of claim 1 further comprising, by the one or more hardware processors executing program instructions:
  further in response to receiving the approval of the request from the second user:
    updating the data access request object to include at least an indication of the approval of the request.

4. The computer-implemented method of claim 1, wherein the shared data asset is a derived data asset comprising a combination of at least two shared data assets, and wherein the shared data asset object identifies the shared data asset as derived.

5. The computer-implemented method of claim 1, wherein the shared data asset object comprises metadata including at least one of: schema, update frequencies, owner, tag, approver, column identifier, column description, derivation, or filtering.

6. The computer-implemented method of claim 1, wherein the data access request object comprises metadata including at least one of: forms, conversations, updates, approvals, re-approvals, statuses, or versions.

7. The computer-implemented method of claim 1 further comprising, by the one or more hardware processors executing program instructions:
  receiving, from the second user, a second request to stop sharing the shared data asset with the first user; and
  in response to receiving the second request from the second user, limiting access to the shared data asset.

8. The computer-implemented method of claim 1, wherein the shared data asset is included in a shared data asset library.

9. The computer-implemented method of claim 1, wherein the shared data asset is scoped or filtered from the data asset, and wherein the shared data asset object includes information on the scoping or filtering of the data asset.

10. The computer-implemented method of claim 1 further comprising, by the one or more hardware processors executing program instructions:
  requesting, from the first user, a justification with the request to access a shared data asset; and
  updating the data access request object with the justification.

11. The computer-implemented method of claim 1, wherein the shared data asset is updated, and wherein the updates are propagated.

12. The computer-implemented method of claim 1, wherein the data access request object is versioned.

13. The computer-implemented method of claim 1, wherein the data access request object is publishable.

14. The computer-implemented method of claim 1, wherein the shared data asset is associated with at least one namespace or workspace, and wherein granting the first user access to the shared data asset includes updating a namespace or workspace associated with the shared data asset.

15. The computer-implemented method of claim 1 further comprising, by the one or more hardware processors executing program instructions:
  receiving an input from the first user requesting to view a graph-based visualization of objects associated with the shared data asset object; and
  in response to receiving the input:
    generating a graph-based visualization of objects associated with the shared data asset object, the graph-based visualization including graphical nodes indicative of objects and graphical connectors indicative of links between the objects, wherein the objects associated with the shared data asset object include: any tags associated with the shared data asset, any derived data assets associated with the shared data asset, and any data access requests associated with the shared data asset.

16. A system comprising:
one or more computer-readable storage mediums having program instructions embodied therewith; and
one or more processors configured to execute the program instructions to cause the system to:
  receive, from one or more users, approval to share a data asset;
  in response to receiving approval to share the data asset, generate a shared data asset object associated with the shared data asset;
  receive, from a first user, a request to access the shared data asset, wherein:
    the first user is different from the one or more users, and
    the shared data asset object identifies at least a second user authorized to approve access to the shared data asset;
  in response to receiving the request from the first user:
    generate a data access request object including at least an identification of the first user and an identification of the shared data asset object; and
    provide an indication of the data access request object to the second user associated with the shared data asset object;
  receive, from the second user, an approval of the request to access the shared data asset; and
  in response to receiving the approval of the request from the second user:
    grant the first user access to the shared data asset associated with the shared data asset object.

17. A computer program product comprising one or more computer-readable storage mediums having program instructions embodied therewith, the program instructions executable by one or more processors to cause the one or more processors to:
  receive, from one or more users, approval to share a data asset;
  in response to receiving approval to share the data asset, generate a shared data asset object associated with the shared data asset;
  receive, from a first user, a request to access the shared data asset, wherein:
    the first user is different from the one or more users, and
    the shared data asset object identifies at least a second user authorized to approve access to the shared data asset;
  in response to receiving the request from the first user:
    generate a data access request object including at least an identification of the first user and an identification of the shared data asset object; and
    provide an indication of the data access request object to the second user associated with the shared data asset object;

receive, from the second user, an approval of the request to access the shared data asset; and
in response to receiving the approval of the request from the second user:
grant the first user access to the shared data asset associated with the shared data asset object.

\* \* \* \* \*